(12) United States Patent
Khan

(10) Patent No.: US 8,760,415 B2
(45) Date of Patent: Jun. 24, 2014

(54) DISPLAY WITH OVERLAYED ELECTRONIC SKIN

(75) Inventor: Asad Khan, Kent, OH (US)

(73) Assignee: Kent Displays Incorporated, Kent, OH (US)

( * ) Notice: Subject to any disclaimer, the term of this patent is extended or adjusted under 35 U.S.C. 154(b) by 567 days.

(21) Appl. No.: 12/729,678

(22) Filed: Mar. 23, 2010

(65) Prior Publication Data

US 2010/0245221 A1  Sep. 30, 2010

Related U.S. Application Data

(60) Provisional application No. 61/164,659, filed on Mar. 30, 2009.

(51) Int. Cl.
G06F 3/033 (2013.01)
(52) U.S. Cl.
USPC .......................................................... 345/173
(58) Field of Classification Search
USPC ................................................... 345/87, 173
See application file for complete search history.

(56) References Cited

U.S. PATENT DOCUMENTS

| | | | |
|---|---|---|---|
| 4,685,771 A | 8/1987 | West et al. |
| 5,347,811 A | 9/1994 | Hasegawa et al. |
| 5,453,863 A | 9/1995 | West et al. |
| 5,493,430 A | 2/1996 | Lu et al. |
| 5,644,330 A | 7/1997 | Catchpole et al. |
| 5,691,795 A | 11/1997 | Doane et al. |
| 5,748,277 A | 5/1998 | Huang et al. |
| 5,933,203 A | 8/1999 | Wu et al. |
| 6,104,448 A | 8/2000 | Doane et al. |
| 6,133,895 A | 10/2000 | Huang |
| 6,154,190 A | 11/2000 | Yang et al. |
| 6,268,839 B1 | 7/2001 | Yang et al. |
| 6,359,673 B1 | 3/2002 | Stephenson |
| 6,377,321 B1 | 4/2002 | Khan et al. |
| 6,654,080 B1 | 11/2003 | Khan et al. |
| 6,752,430 B2 | 6/2004 | Holt et al. |

(Continued)

FOREIGN PATENT DOCUMENTS

WO  2005081779  9/2005

OTHER PUBLICATIONS

"Flexible Electronic Skin Display", SID Intl. Symp. Disgest Tech., 40 16 (2009) by E. Montbach et al.

(Continued)

*Primary Examiner* — Jonathan Boyd
(74) *Attorney, Agent, or Firm* — Pearne & Gordon LLP

(57) ABSTRACT

This disclosure features an electronic display with overlayed electronic skin. The display includes an outer transparent display surface and can be placed in a dark state or in a bright state. The skin overlays the outer display surface and includes an electro-optic layer. Transparent electrically conductive layers are disposed on each side of the electro-optic layer. Electronic circuitry applies voltages to the electrically conductive layers enabling the electro-optic material of the electronic skin to be placed into a substantially transparent state and a reflective state. Images or colors can be displayed on the electronic skin while portions of the electronic skin are in the reflective state and light passing through the electronic skin is absorbed by the display in the dark state. When the display is in the bright state images or colors can be displayed on the display that can be seen through the electronic skin.

25 Claims, 12 Drawing Sheets
(7 of 12 Drawing Sheet(s) Filed in Color)

(56) References Cited

U.S. PATENT DOCUMENTS

| | | |
|---|---|---|
| 6,788,362 B2 | 9/2004 | Stephenson et al. |
| 6,788,363 B2 | 9/2004 | Liu et al. |
| 6,816,138 B2 | 11/2004 | Huang et al. |
| 6,833,885 B2 | 12/2004 | Hisamitsu et al. |
| 6,934,792 B1 | 8/2005 | Nakazawa |
| 7,061,559 B2 | 6/2006 | Khan et al. |
| 7,075,593 B2 | 7/2006 | Vidal et al. |
| 7,170,481 B2 | 1/2007 | Doane et al. |
| 7,188,996 B2 | 3/2007 | Parker |
| 7,236,151 B2 | 6/2007 | Doane et al. |
| 7,351,506 B2 | 4/2008 | Schneider et al. |
| 7,479,940 B2 | 1/2009 | Marhefka |
| 2003/0160741 A1 | 8/2003 | Martinez |
| 2007/0126674 A1 | 6/2007 | Doane |
| 2007/0152928 A1 | 7/2007 | Doane et al. |
| 2007/0164980 A1* | 7/2007 | Manning ................ 345/104 |
| 2007/0277659 A1 | 12/2007 | Schneider et al. |
| 2008/0074383 A1* | 3/2008 | Dean ..................... 345/156 |
| 2009/0033811 A1 | 2/2009 | Schneider |
| 2009/0096942 A1 | 4/2009 | Schneider et al. |
| 2009/0284691 A1* | 11/2009 | Marhefka et al. ........... 349/86 |
| 2010/0216635 A1 | 8/2010 | Kazmaier et al. |

OTHER PUBLICATIONS

Amorphous Silicon Thin-Film Transistor Active-Matric Reflective Cholesteric Liquid Crystal Display: pp. 979-982 (1998).

J.William Doane and Asad Khan, Cholesteric Liquid Crystals for Flexible Displays, Flexible Flat Panel Displays, 331-354, 2005, John Wiley & Sons, Ltd.

\* cited by examiner

Fig. 6e
Fig. 6f
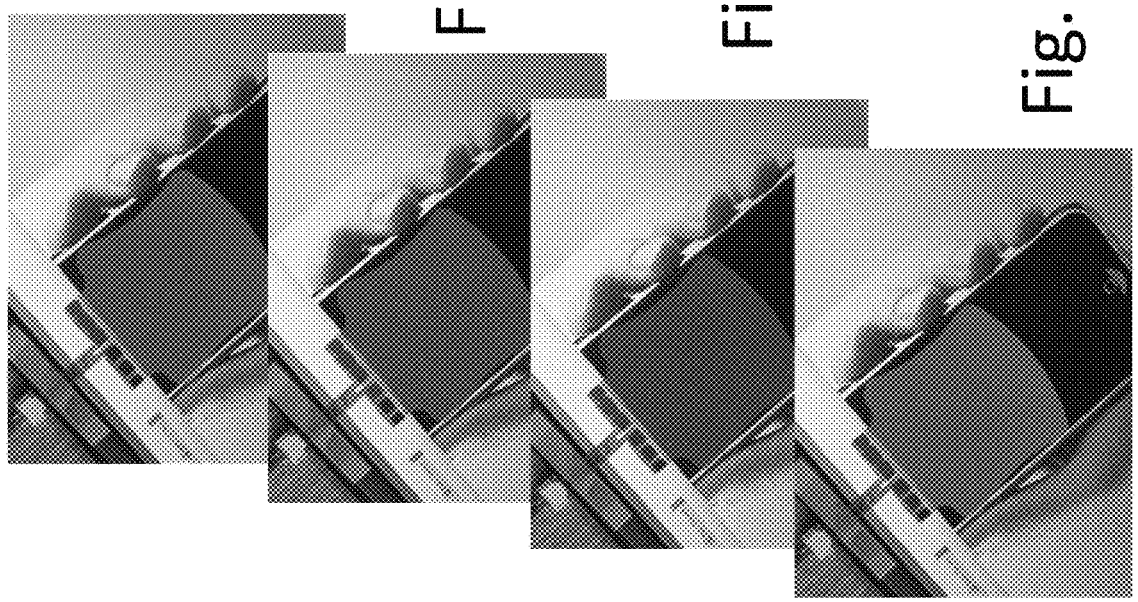
Fig. 6a
Fig. 6b
Fig. 6c
Fig. 6d

DISPLAY WITH OVERLAYED ELECTRONIC SKIN

CROSS-REFERENCE TO RELATED APPLICATION

This application claims the benefit of U.S. Provisional Patent Application Ser. No. 61/164,659 filed on Mar. 30, 2009, the contents of which are incorporated herein by reference in their entirety.

TECHNICAL FIELD

The technical field relates to display devices and to electronic skin affixed to the devices.

BACKGROUND

In order to satisfy the cell phone customer's desire for personal customization, the handset market offers a variety of different means of customization. Some handset manufactures sell phones in several colors. Such marketing requires the cell phone user to select the color of the phone during the sell process with no flexibility to change during the contract period. Other manufacturers offer replacement covers to the most popular types of phones. This solution meets the need for customization on one hand and the need to adopt and change color during the ownership period. Yet another customization option is the use of covers. Covers are made to fit popular phone modules. They usually are of silicon or rubber base and their main purpose is to protect the body of the phone and allow certain color collections. The user can replace the cover as many times as he may want, with no need for professional assistance, with high flexibility and re-use. A problem with this technique is the relatively high cost and small color selection of covers.

An electronic skin or cover on a cell phone housing or case to allow the cell phone customer to instantly change its color is a feature desired by nearly every handset manufacturer. Referred to as an electronic skin, such a device allows the consumer instant freedom to change the color and personalize their phone, laptop, iPod® music player or other electronic device. An electronic skin can indicate functional features with color such as ring tones (silent alert), call waiting and missed calls on cell phones. Customers of hand held devices are attracted to colorful designs that can reflect personal style and select them for some of the same reasons that they select clothing colors and fashion accessories. Patterns, in addition to color, give the consumer added capability of adding logos or even photos. The primary motivation for the incorporation of electronic skins is product differentiation, which is important in mobile consumer electronics for increasing the manufacturer's market share and margin.

The concept of electronically changing the color of a handheld or portable electronic device is not new and cell phone manufacturers have considered all available display technologies for this application. The important requirement of low power eliminates all of the emissive display technologies such as OLED, electroluminescent displays and backlit LCDs. Emissive displays such as these are not suitable technologies for electronic skins on cell phones since they draw substantial power from the cell phone battery and quickly drain it leaving little power available for the functional use of the cell phone or player. Electronic skins used on portable electronics therefore should employ a color reflective technology in order to avoid the power loss involved in generating light necessary for emissive display technologies.

There are many reflective display technologies. However, many of them are not attractive for an electronic skin application because of many requirements: high reflectivity, wide color gamut, low cost, mechanical robustness, and thin conformable geometries in addition to low-power. An old and well known bistable technology is the electrochromic display technology. This technology, however, has insufficient color gamut and, even though bistable, is not a low power option in that it is current driven requiring significant power from the battery to change the color. The bistable electrophoretic technology is used in black and white displays and covers but it is not yet developed for color. Further, it is not attractive for conformable color electronic skin development as it would require high resolution patterning of the primary colors which adds considerably to the cost and limits the brightness to less than 33%. Electromechanical displays also suffer from this 33% reflectance limitation. Electrowetting lenses (U.S. Pat. No. 6,934,792) have been proposed; however, this scheme results in low reflectivity, the inability to mix colors, and suffers from objectionable layer thickness. Polarizer-based LCD technologies (e.g., Zenthal Displays, bistable STN) have been made bistable for reduced power but these use color filters to achieve color and as such can suffer from not being reflective enough for electronic skin applications.

A potential reflective technology that has been considered for electronic skins is the electrowetting or electrofluidic display technology. One major limitation of this technology for electronic skins is that power must be applied repetitively to display a particular color. While the power drain is small compared to an emissive display, it nonetheless becomes quite significant and excessive on an area the size of an electronic skin since it must be applied continually or continually refreshed in order to maintain the selected color. The color of the phone must be maintained even while the phone is not in operation, a serious problem for this technology. Another serious problem is the complex cell structure further adds excessive cost in an electronic skin application.

At this time the bistable cholesteric liquid crystal technology is the preferred technology and the one most sufficiently advanced for electronic skin applications. It is bistable (see U.S. Pat. Nos. 5,347,811 and 5,453,863) so that no power is required to maintain a selected color on the electronic skin. One of the stable states is a reflective state in which the material takes on a planar texture. In that texture the material reflects a preselected color determined by the components that make up the material. Another stable state is one in which the material takes on the so called focal conic texture that is substantially transparent in the electronic skin application. One can electronically switch between the two states with a voltage pulse of different magnitude. A third state is possible with a continuously applied voltage, called the homeotropic texture that is more transparent than the focal conic texture. Because the planar texture only reflects a selected color and is transparent to other colors the technology is amenable to vertical stacking the layers to achieve a film that can be switched to a multiplicity of colors, U.S. Pat. No. 6,377,321. The intensity of the reflected colored light can be adjusted by the voltage pulse so that a vertical stack of the three primary colors, red, green and blue can be mixed to show any color; 4096 colors have been demonstrated. Unlike the electrofluidic technology, there is no cell structure and an electronic skin is simply made at low cost by coating the display material directly on a flat substrate. The material for the electronic skin application is made by dispersing the cholesteric liquid crystalline material in a polymeric matrix making it rugged for skin use and aiding its manufacturability on a web line. Light traveling through the cholesteric liquid crystal layer of cholesteric liquid crystal displays, is absorbed by any of the following items located at the back of the display: a back color layer (U.S. Pat. No. 5,493,430 incorporated herein by reference); black paint coated on an inside of a back glass or polymer substrate; and a nonreflective back substrate such as fabric, a solar cell or an active matrix. Another important advantage of the cholesteric technology over other reflective technologies, such as the electrophoretic or electrofluidic technologies, is that bistable cholesteric electronic skins can show high resolution patterns such as logos or pictures simply by patterning the electrodes and not requiring an expensive active matrix backplane. Cholesteric electronic skins can be electronically multiplexed to provide patterned full color images without the active matrix, which is suitable for low cost cell phone skins.

Another application of cholesteric displays is writing tablets. A variety of writing tablet technologies have been proposed over the years. In one technology described in U.S. Pat. No. 6,104,448 an image can be written on a tablet with an untethered stylus. The pressure of the stylus changes a transparent texture of the cholesteric liquid crystal to the color reflective texture at the stylus tip. When viewed on the black background (e.g., a black coating on a back substrate), a line traced by the stylus in the color reflective texture is bright and contrasts strongly against the transparent texture which appears black on the black background. The bistability of these two textures allows the image to remain on the tablet until erased. The image is instantly erased by application of a voltage to two transparent electrodes that sandwich the cholesteric material in between. An applied voltage drives the color reflective texture created by the stylus tip back to the transparent texture thereby erasing the image. A new image can then be traced by the stylus.

Up to now, electronic skins have only been considered for the housing of the electronic device; see for example published U.S. patent applications Pub. Nos. US 2003/0160741 and US 2008/0074383. In recent years, however, the electronic display on the device is becoming larger, and by adding touch screen capability, the display can replace buttons and keys on the device. The display therefore now occupies nearly all of the area on one side of the device leaving little remaining housing for the electronic skin to cover. When the device is not in use, the display is black as is the entire front surface of the device. The device of this disclosure addresses that issue by being an electronic skin that can overlay or cover the display. The inventive skin is substantially transparent when the display is turned on and in use; however, can be a decorative color when the display is off and fully functional as an electronic skin or writing tablet skin.

TECHNICAL SUMMARY

The device of this disclosure is an electronic display with overlayed electronic display skin. Two primary functions that will be discussed below are use as a decorative covering of the display and/or as a writing tablet over the display. The display has an outer transparent display surface made of clear glass or plastic. The display includes a bright state and a dark state as in the following examples: 1) The bright state of an LCD is when the backlight of the display is ON for displaying images and the dark state is when the backlight of the display is OFF or when the display is placed in a dark state even with the backlight ON; 2) The bright state of an OLED is when emissive elements of the OLED are ON for displaying images and the dark state is when emissive elements are OFF showing a dark screen. It should be appreciated that reference to a dark state or a bright state of the display does not require the brightest or darkest possible settings the display is capable of producing, for the disclosed device to be operative. The electronic skin preferably covers the outer display surface so as to be more proximal to a viewer than the display is to the viewer. The electronic skin includes an electro-optic layer comprising electro-optic material (e.g., bistable cholesteric liquid crystal material). Transparent electrically conductive layers are disposed on each side of the electro-optic layer. Electronic circuitry applies voltages to the electrically conductive layers that enable the electro-optic material to be placed into various states of reflectance such that the brightness or intensity of reflection includes a substantially transparent state (e.g., a state of minimum reflectance), a reflective state (e.g., a state of maximum reflectance) and preferably reflectances or brightnesses (shades of gray) in between (gray scale states). The electrically conductive layers can be patterned or unpatterned. When patterned, the electronic skin can be in the form of discrete segments or a matrix of pixels (i.e., a passive matrix display). When patterned as segments each segment can independently driven or multiplexed. When patterned as a matrix of pixels the electronic skin can include a plurality of parallel column electrodes on one side of the electro-optic material and a plurality of parallel row electrodes on the other side of the electro-optic material, the columns being orthogonal to the rows. The pixels of the passive matrix electronic skin can be individually addressed to reflective, substantially transparent or gray scale states to produce images on the electronic skin when it is used as a decorative covering of the underlying display with icons, advertisements or the like. When unpatterned, the entire electronic skin can be placed into reflective, or gray scale states of a selected color. When the display is in the dark or bright states, images or colors can be displayed on the electronic skin while light passing through the display skin is absorbed by the display (typically the display would be dark where the images or colors on the skin exhibit a higher contrast). When the display is in the bright state, images displayed on the display can be seen through the electronic skin. In the case of a cholesteric electronic skin the skin is most transparent or optically clear when the electronic skin is held in the homeotropic texture. It is only moderately transparent in the planar and focal conic textures. The planar and focal conic textures are both stable in the absence of a voltage applied to the skin electrodes whereas the homeotropic state requires a holding voltage or sequence of voltage pulses.

The electronic skin can be a multilayer film that can include one substrate, or two or more substrates; the surface of the display may serve as a substrate. A substrate as defined herein is a structure that supports components of an electro-optic (e.g., liquid crystal) display including an electro-optic layer that is electrically addressed to produce images. Components of the multilayer stacked display skin are similar to that described in proceedings publication "Flexible Electronic Skin Display", *SID Intl. Symp. Digest Tech.,* 40 16 (2009) by E. Montbach et al. Other multilayer stacked designs which may be adapted for electronic skins are described in U.S. Pat. No. 7,170,481 entitled Single Substrate Liquid Crystal Display, and U.S. Pat. No. 7,236,151 entitled Liquid Crystal Display, which are incorporated herein by reference in their entireties. The substrate need not be rigid but can be flexible or drapable as disclosed in the U.S. Pat. No. 7,236,151. Glass, metal, polymer, paper and fabric or textile can all be used as substrate materials so long as they are sufficiently transparent. The substrate is a generally thin layer, but is often significantly thicker than other components of the display. As defined herein and consistent with U.S. Pat. No. 6,788,362 owned by Kodak, a substrate is a layer that has a thickness of at least 10 microns and, in particular, at least 50 microns. Substrates of liquid crystal displays on the market today can have a thickness of 100 microns or more and substrates such as fabrics can be substantially thicker exceeding 1000 microns.

One form of the electronic skin used herein includes an electro-optic film including a plurality of layers stacked on each other including outer substrates between which the liquid crystal layers are located and one or two substrates between adjacent liquid crystal layers. Between adjacent liquid crystal layers there can be a single substrate having electrically conductive layers coated on both sides thereof or there can be two substrates with index matching material between them, each having a single electrically conductive layer facing a liquid crystal layer. An electronic skin having one substrate could have an outer protective transparent polymer layer proximal to the viewer (e.g., a clear coat), which is thinner than an ordinary substrate. On the other hand, this protective layer can be a substrate in any of the embodiments described above. The electronic skin can have a distal substrate located between the display surface and a more distal of the electrically conductive layers. The electrically conductive layers are transparent and can be made, for example, of carbon nanotubes or conducting polymer or indium tin oxide, ITO. An index matching material would be located between the rearmost layer of the electronic skin (e.g., the distal substrate) and the display surface to match the indices of refraction of the display surface and this rearmost layer. An index matching material can also be located between the two substrates located between adjacent liquid crystal layers, matching the indices of refraction of the substrates.

The electronic skin can have one, two or three or more liquid crystal layers. These can be stacked on each other. The liquid crystal layers can be in the form of dispersions containing cholesteric liquid crystal-containing droplets or an open network dispersed in a polymer matrix. The liquid crystal can reflect red, green and blue light in a single layer or in each of multiple stacked layers. More specifically, the electro-optic material can be bistable cholesteric liquid crystal material. The electro-optic material may also be comprised of an electrowetting material and even though not bistable be made transparent for viewing the display when in the bright state.

In the preferred case of the cholesteric liquid crystal electro-optic layer, electrically conductive layers are disposed on either side of each liquid crystal layer. In order to increase brightness of a cholesteric liquid crystal layer of the display, both the left and right circular components of the incident light should be reflected. There are two methods to accomplish this: to layer a cholesteric material of one handedness on top of the one of the other handedness or to insert a half wave plate in between two layers of the same handedness. One aspect of the disclosed device coats sublayers of cholesteric materials of different handedness (left hand-LH and right hand-RH) on top of one another in the formation of the liquid crystal layer reflecting a certain wavelength of electromagnetic radiation. A specific display skin includes three stacked liquid crystal layers of bistable cholesteric liquid crystal material each having a pitch length effective to reflect one of red, green and blue in any order. Each of the liquid crystal layers may include cholesteric liquid crystal material dispersed in a polymeric matrix such as described for example in the U.S. Pat. No. 7,351,506 or 7,170,481.

The device that comprises the display with overlayed electronic skin is selected from the group consisting of a cell phone, iPhone® phone, an MP3 player, iPod® music player, a pda, a laptop computer, a notebook computer, a netbook computer, a camera, a desktop monitor, a slate computer, an iPad® electronics device, a handheld electronic device, a portable electronic device, or the like. For example, the device could be an iPhone® phone having the display skin covering the display or a laptop having the display skin covering all or a portion of the monitor. The display is selected from the group of backlit displays such as thin film transistor (TFT-LCD), super twisted nematic (STN), twisted nematic (TN), bistable nematic and zenithal bistable. The display may alternatively be selected from a group of emissive displays such as LED, OLED, electro-fluorescent or others. It is possible to employ the inventive electronic skin with a reflective display such as an electrophoretic, or zenith display.

The image on the display can be viewed more clearly through the electronic skin when the display is in the bright state, if the electronic circuitry applies voltages to the conductive layers that place the liquid crystal material of the skin in the homeotropic texture.

The electronic skin can cover all or a portion of the adjacent display such as an underlying display.

In one embodiment the skin is in the form of a writing tablet that covers all or a portion of the display. A transparent substrate or transparent, proximal polymer layer at a proximal location of the display forms a writing surface. The substrate or proximal polymer layer is flexible so as to be able to reduce a gap between the electrically conductive layers when writing pressure is applied to the writing surface. The electrically conductive layers are transparent. The circuitry can enable application of the voltages to the electrically conductive layers to erase the tablet or in some tablet designs while writing or selectively erasing where the pressure is locally applied to the tablet by a stylus of finger. The voltages enable the liquid crystal material to be placed into various states of reflectance including a reflective state and a substantially transparent state. Images or colors can be displayed on the tablet electronic skin while light passing through the electronic skin is absorbed by the display. When the display is bright, images can be displayed on the display that can be seen through the electronic skin although the display underneath will be more clearly visible when the tablet skin is erased or in the homeotropic texture.

The writing tablet skin can include one cholesteric liquid crystal layer or at least two stacked cholesteric liquid crystal layers each having a pitch length effective to reflect a different color or different component of circular polarized light or both. The circuitry is used to select a reflected color of one of the liquid crystal layers where the writing pressure is applied by applying voltage that places one or more other liquid crystal layers in the focal conic texture or the planar texture where the writing pressure is applied.

The writing tablet can be used on mobile phones, digital cameras, and even desktop monitors where use is made of the black background of the display. The transparent tablet is optically coupled to conventional backlit displays with use of an index matching material. When the writing tablet is used, the display is darkened (e.g., turning OFF a backlit display or emissive elements) providing a black background. The transparent tablet can then be used to jot down notes, make art work, and doodle. The writing on the electronic skin may even stay on when the backlit display is in the bright state (e.g., turned ON in the case of a backlit display) since the contrast of the electronic skin will not be very high to substantially interfere with viewing images on the display.

The disclosed device comprises the combination of a conventional backlit, emissive or reflective display and a transparent writing tablet coupled to the front of the conventional display. The writing tablet can utilize the contrast of the conventional display when it is OFF to provide sufficient contrast to the writing tablet. When the conventional display is ON, the backlit or emissive image may provide little contrast to the image on the writing tablet with the result being that the image of the conventional display predominates. However, depending on the type of writing tablet, if the writing tablet is positioned at a corner or side of the conventional display, the conventional display could provide a bright background that would contrast writing on the writing tablet enabling the writing tablet to be used even when the conventional display is ON. The transparent writing tablet skin includes transparent substrates and a liquid crystal material disposed therebetween such as that in which regions of liquid crystal are preferably dispersed in a polymer matrix to control the writing pressure. The writing tablet electronic skin can be in the form of a flexible thin film that adheres to the conventional display. The conventional display supports the writing tablet electronic skin and enables writing pressure to be applied to the writing tablet electronic skin. The writing tablet electronic skin may be applied to conventional displays including but not limited to computer monitors, cell phones, lap top monitors, personal digital assistants (pdas) and the like.

In another embodiment, the electronic skin is in a form of a decorative covering of all or a portion of the underlying display. The decorative electronic skin covering can be electronically addressed to display a selected color or image. The display skin can include one or stacked liquid crystal layers and electrically conductive layers on both sides thereof. The electrically conductive layers, and any substrates or polymer layers if used, are transparent. Each liquid crystal layer can reflect light of a different color. A particular display includes stacked liquid crystal layers that reflect red, green and blue in any order. The liquid crystal layers are connected to the electronic circuitry so that the voltages can be applied to each of the liquid crystal layers independently of the other liquid crystal layers. The electronic circuitry can apply the voltages to the electrically conductive layers to drive the liquid crystal material into the substantially transparent state (e.g., minimum reflectance), the reflective state (e.g., maximum reflectance) and gray scale states having reflectances or brightnesses (shades of gray) in between. The display skin is coupled to the display by an index matching material. Typically, contrast is provided to the electronic skin as a decorative covering of the display, when the display is in the dark state because the device would not need to expend any power keeping color or images on the display skin.

As defined herein, the electronic skin is see-through, as judged by the ability to see images on the underlying display, which ranges from optically clear to some scattering allowed. Thus, the display skin is see-through even when portions of it are in the planar state, but becomes more see-through or transparent when the entire display is placed in the focal conic state, and even more see-through or transparent when the entire display is placed in the homeotropic state.

Any means for addressing a bistable cholesteric liquid crystal display known in the art, and preferably adaptable to a bistable cholesteric display may be used for addressing the cholesteric electronic skin. In the decorative electrically addressable skins having patterned electrodes, the means for addressing the liquid crystal can be drive and control electronics operatively linked to the electrodes for application of driving voltages across the liquid crystal material in accordance with any suitable drive scheme known to those of ordinary skill in the art. Examples of suitable drive schemes and electronics include, but are not limited to, the conventional drive scheme disclosed in U.S. Pat. No. 5,644,330 implemented with either bipolar or unipolar drive chips, the dynamic drive scheme disclosed in U.S. Pat. No. 5,748,277 or 6,154,190 for faster or lower temperature response, the cumulative drive scheme disclosed in U.S. Pat. No. 6,133,895, for near video response, and the Multiconfiguration Display Driver disclosed in the Ser. No. 10/782,461, all of which are incorporated herein by reference. An active matrix may be used to drive a patterned electronic skin such as described in the publication: "*Amorphous Silicon Thin-Film Transistor Active-Matrix Reflective Cholesteric Liquid Crystal Display*" SID Proceedings of Asia Display "pages 979-982 (1998) or U.S. Pat. No. 6,816,138; however, the skin, in this case, would not be as transparent since the transistor circuitry would mask some of the light passing through the skin. In these embodiments, the displays can be fabricated without patterned electrodes. The ledges of substrates where the ends of electrodes are located are left accessible for interconnecting the drive electronics and electrode layers may extend beyond the periphery of the other layers of the display for interconnecting the drive electronics, such as disclosed in U.S. patent application entitled "Stacked Display with Shared Electrode Addressing," Ser. No. PCT/US2005/003141, filed Jan. 28, 2005, which is incorporated herein by reference in its entirety.

Many additional features, advantages and a fuller understanding of the invention will be had from the accompanying drawings and the detailed description that follows. It should be understood that the above Summary of the Invention describes the invention in broad terms while the following Detailed Description describes the invention more narrowly and presents preferred embodiments that should not be construed as necessary limitations of the broad invention as defined in the claims.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 6 shows an electronic skin, of Decorative Electronic Skin Example 1, overlaying a backlit TFT LCD laptop monitor showing the image of a mobile phone. The photographs are used to show electronic skin operation for:

FIG. 6a: LCD turned off with electronic skin switched to reflect red;

FIG. 6b: LCD turned off with electronic skin switched to reflect green;

FIG. 6c: LCD turned off with electronic skin switched to reflect blue;

FIG. 6d: LCD turned off with electronic skin switched to reflect magenta;

FIG. 6e: LCD turned on with electronic skin switched to the homeotropic state; and FIG. 6f: LCD turned on with electronic skin switched to the focal-conic texture.

FIG. 12 are photographs, for Writing Tablet Example 2, of a as writing tablet skin overlaying a backlit TFT LCD laptop screen monitor. The photographs are used to show electronic skin operation for:

DETAILED DESCRIPTION

Figure 1:
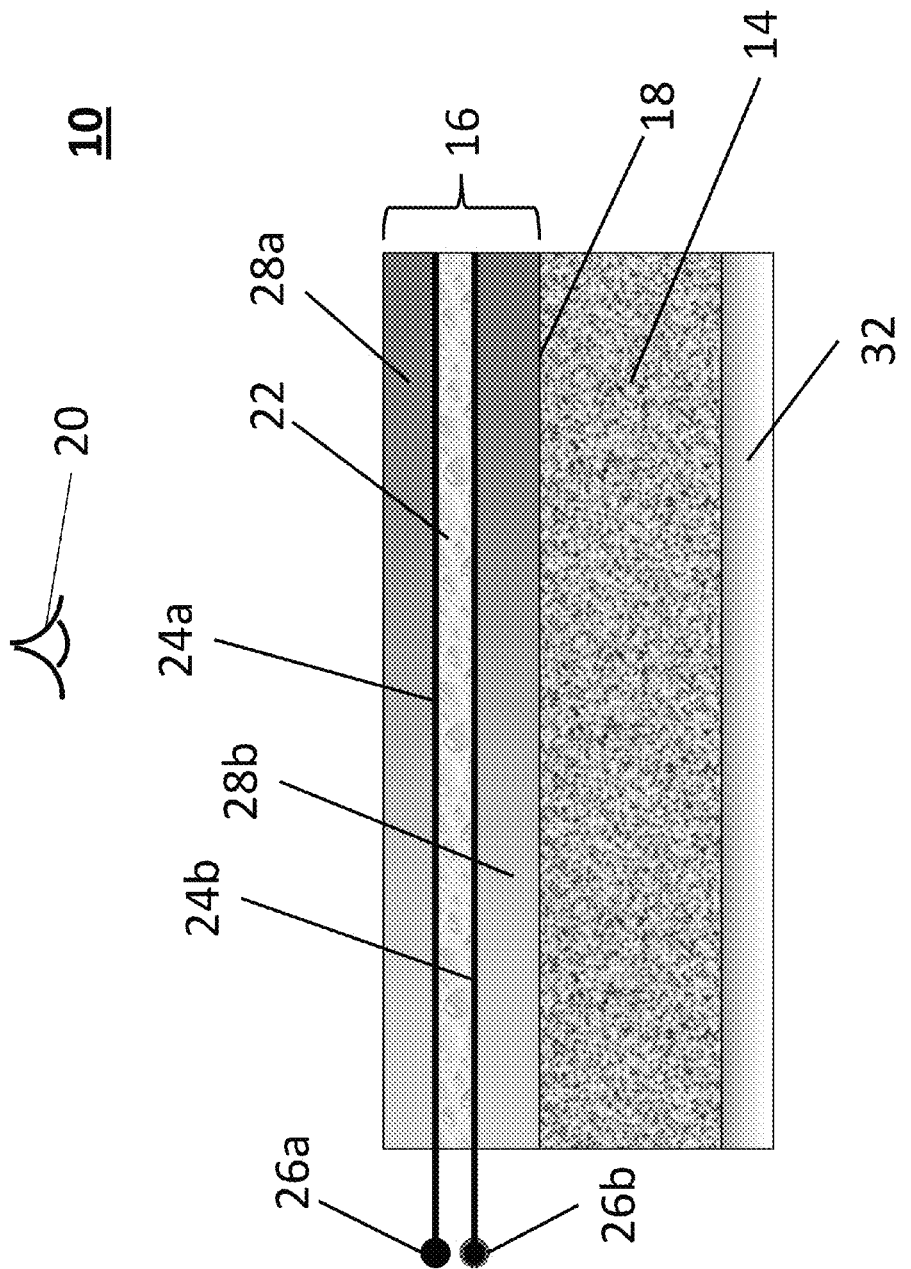
FIG. 1 is a side view of a display with overlayed electronic skin according to this disclosure.
Figure 2:
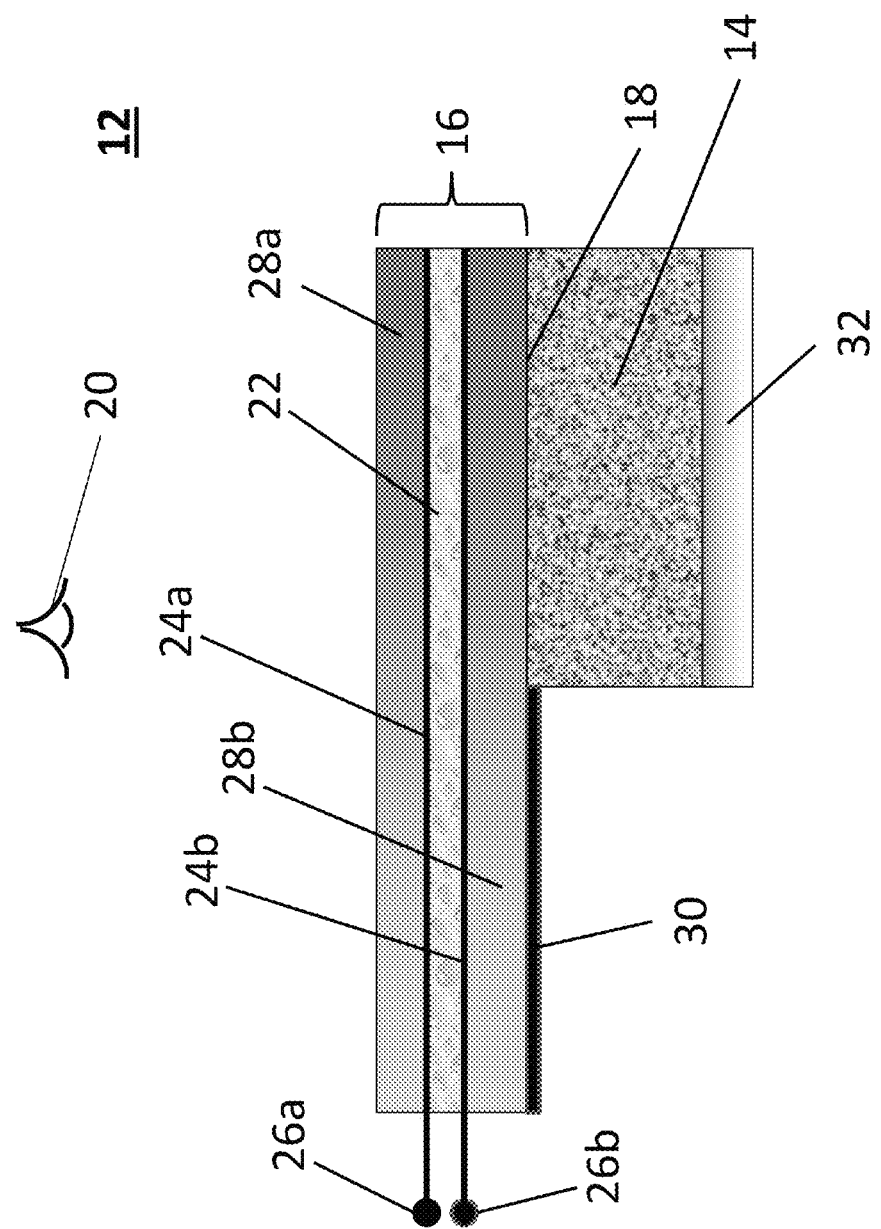
FIG. 2 is a side view of a display that is partially covered by electronic skin.

This disclosure features devices 10 and 12, of FIGS. 1 and 2 respectively, each including an electronic display 14 with overlayed electronic skin 16. The electronic display 14 has an outer transparent display surface 18 made of glass or plastic. The electronic skin 16 covers the outer display surface so as to be more proximal to a viewer 20 than the display 14 is to the viewer. The display skin includes a liquid crystal layer 22 comprising liquid crystal material preferably a cholesteric liquid crystal dispersed in a polymeric matrix. The liquid crystal dispersion layer may be made by polymer induced phase separation (PIPS), solvent induced phase separation (SIPS) or thermally induced phase separation (TIPS), or can be an emulsion in some designs, which are made in the manner disclosed in the U.S. Pat. No. 7,351,506 or 7,236,151. Transparent electrically conductive (electrode) layers are disposed on each side of the liquid crystal layer. One of the electrodes 24a is located more proximal to the viewer (proximal electrode) and the other electrode 24b is more distal to the viewer (distal electrode). The electronic skin includes a proximal substrate 28a above the proximal electrode 24a and a distal substrate 28b below the distal electrode. Electrical interconnects 26a, 26b extend from the proximal electrode 24a and distal electrode 24b to a location outside the skin. Electronic circuitry (drive electronics) applies voltages to the electrically conductive layers via the interconnects, which enable the liquid crystal material to be placed into a substantially transparent state, a reflective state or gray scale states with intensity of reflection or brightness therebetween. The electrically conductive layers can be patterned or unpatterned (they are unpatterned in FIGS. 1 and 2). When patterned, the display can be in the form of segments or a matrix of pixels (i.e., a passive matrix display). These segments or pixels can be individually addressed to substantially transparent, reflective or gray scale states to produce images on the display skin, for example, when it is used as a decorative covering of the underlying display. An active matrix can be used to address a matrix of pixels as is known the art, however, the thin film transistor (TFT) configuration in the active matrix reduces the transparency of the skin. When unpatterned, the entire display skin can be placed into reflective, substantially transparent or gray scale states.

The display 14 includes a bright state (e.g., a backlight 32 for displaying images on an LCD when the backlight is ON or in the case of an emissive display when the emissive elements are ON). The display also includes a dark state (e.g., when the backlight 32 is OFF or emissive elements are OFF). In the case of a reflective display such as an electrophoretic display there is no back light and the dark state can be achieved by turning the pixels to a dark or non-reflective state. When the display 14 is dark images or colors can be displayed on the skin 16 while light passing through the skin is absorbed by the dark display. When the display 14 is bright images can be displayed on the display that can be seen through the skin 16. This can be facilitated when the backlight is ON by the electronic circuitry applying voltages to the conductive layers that place the liquid crystal material of the electronic skin in a focal conic texture or a homeotropic texture. This will make the electronic skin clearer than if all or parts of it remain in the light reflecting planar texture.

The electronic skin can be built using phase separated dispersions as described in the publication "Flexible Electronic Skin Display", *SID Intl. Symp. Digest Tech.*, 40 16 (2009) by E. Montbach et al. and U.S. Pat. No. 7,351,506. Alternatively, the skin can be made using polymer dispersed liquid crystal (e.g., emulsions) on a casting layer applied to a release layer and then removed from the release layer and transferred onto the display surface as disclosed in U.S. patent application Ser. No. 10/587,548 entitled Liquid Crystal Display Films, which is incorporated herein by reference in its entirety. The transfer skin can have index matching material formed on it or the display can have index matching material coated on it so that the index matching material is disposed between the transfer skin and the display. The transfer skin can include a layer of adhesive for adhering to the display.

The electronic skin can occupy all of the underlying display (FIG. 1) or a portion of the area of the underlying display (FIG. 2). When it is desired to see-through the electronic skin to the underlying colors or images of the electronic display, there is no light absorbing back layer behind the liquid crystal layer of the electronic skin. However, for example, where the display skin overlaps a non-display portion of the underlying device or a portion of the underlying display not needed to be seen, a light absorbing layer 30 can be disposed behind the liquid crystal layer of the electronic skin. The liquid crystal layer above the light absorbing layer will not rely on the underlying display to produce suitable contrast whereas the rest of the liquid crystal layer having no light absorbing layer behind it will rely on the electronic display to provide a suitable dark or color for contrast with the color or images of the electronic skin.

I. Decorative Electronic Skin

The electronic skin includes at least one liquid crystal layer each having transparent electrically conductive layers on both sides thereof. If two or more liquid crystal layers are used the electrically conducting layers are connected to the electronic circuitry so that the voltages can be applied across each liquid crystal layer independently of the other liquid crystal layers. The electronic circuitry can apply the voltages to the electrically conductive layers to drive the liquid crystal material into the substantially transparent state, the reflective state and gray scale states having brightnesses therebetween.

Mobile phones, music playback devices, etc. have advanced in the marketplace to a point where the electronic display screens have become larger and larger, often occupying at least 90% of the front surface of the housing (e.g., the iPod® and iPhone® devices). The electronic skin is affixed to the display screen itself so that the screen can, like the housing, have a selected color and/or pattern. Like electronic skins disclosed for the housing, the bistable cholesteric liquid crystal skin is reflective and will not draw any power from the battery while displaying any selected color pattern; power is only needed to change the color and pattern or to maintain a transparent appearance of the electronic skin when the backlight or emissive elements of the display are ON. The electronic skin 16 is substantially transparent or see-through to the backlight 32 of the display 14 so that when the display of the device is turned ON the skin and its colored pattern become essentially invisible and the image on the display 14 is viewed on the viewable area or screen of the device 10, 12 (i.e., the area of substrate 28a) instead of the color pattern on the electronic skin. When the display backlight 32 is turned OFF or is ON but the display dark, however, the electronic skin 16 becomes visible and the screen surface takes on the color and pattern of the electronic skin.

Figure 3:
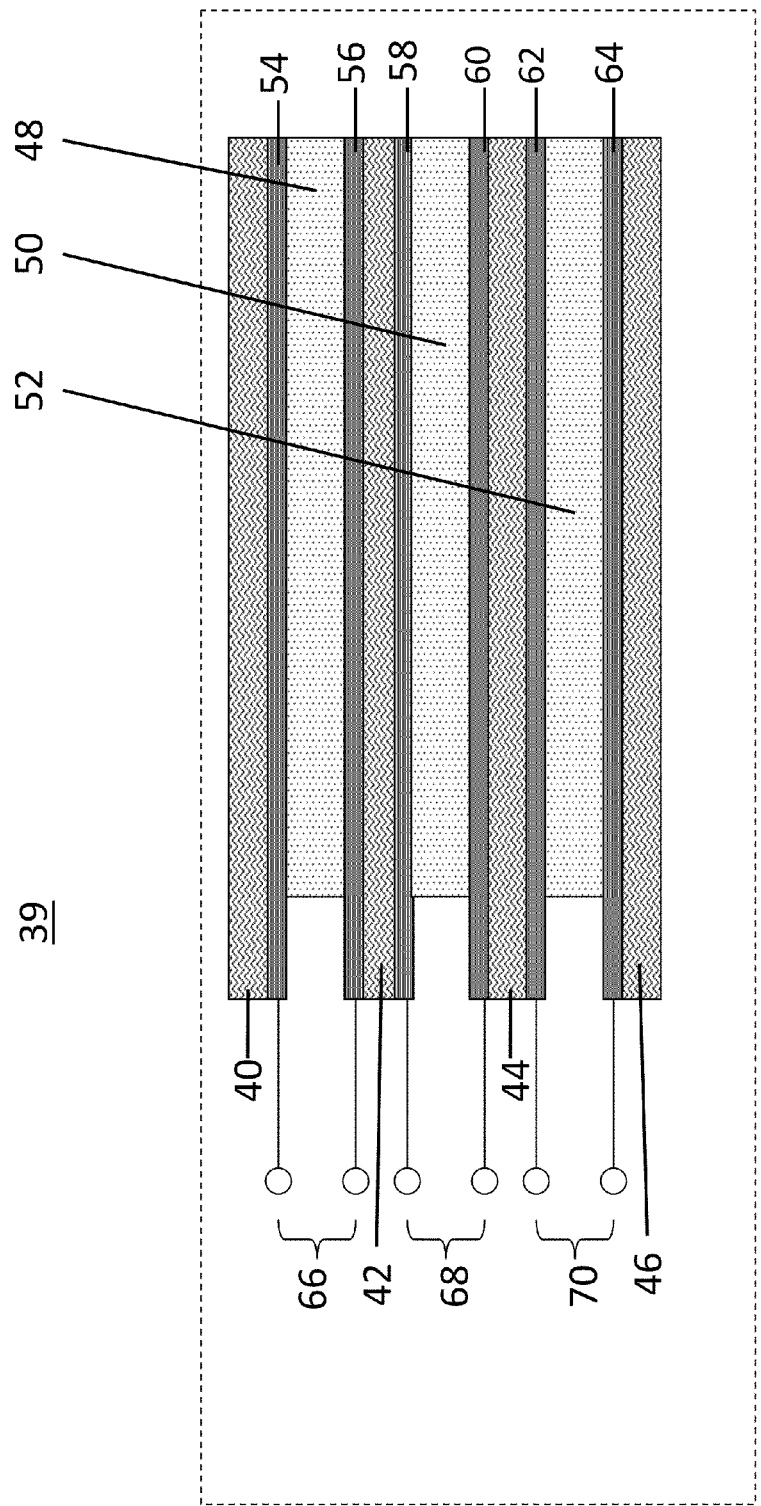
FIG. 3 is a cross-sectional side view of a multilayer electronic skin according to the invention.

FIG. 3 shows an example of the display skin 16: a multilayer, triple stack electronic skin 39 including thin transparent plastic substrates 40, 42, 44 and 46. Substrate 40 is proximal to the viewer while substrate 46 is distal to a viewer and is located at the rear of the electronic skin. The electronic skin also includes three reflective bistable cholesteric liquid crystal layers 48, 50 and 52, which reflect blue, green and red, respectively, for example. Each inside surface of the substrates is coated with a transparent conductor 54, 56, 58, 60, 62 and 64 to serve as an electrode to the turn the liquid crystal layers (i.e., colors) ON and OFF and adjust their relative brightness. The liquid crystal layers are sandwiched between adjacent conductor layers. Only a single substrate is disposed between adjacent liquid crystal layers, having the conductor layers on both sides of it (e.g., substrate 42 between liquid crystal layers 48 and 50 having electrodes 56, 58 on either side of it). Electrical interconnects 66, 68, 70 extend to the various transparent conductor electrodes. The electronic skin 39 of FIG. 3 is laminated at substrate 46 to the surface of the display screen.

We take advantage of a feature of the LCD technology whereby the screen is black when the display's backlight is dark (e.g., turned OFF) such that this black state then functions as the light absorbing layer of the electronic skin. Another innovative feature of the bistable cholesteric technology is that only about 40% of the colored light is reflected by the cholesteric material in its reflective state such that when the backlight is turned on at least 50% of the backlight is transmitted. The light from the backlight 32 overwhelms the reflected light for the cholesteric film so that its color or pattern is not readily observed when the LCD is in use. Yet another feature of the bistable cholesteric film is that the colored pattern image can be turned OFF when the backlight is turned ON so that the skin is substantially transparent to the viewer. This can be accomplished by placing all of the liquid crystal material of the electronic skin into the homeotropic or focal conic texture. Placing the cholesteric liquid crystal material in the homeotropic texture achieves the skin's most transparent condition; however, will require constant application of voltage whereas once the material is placed in the focal conic texture it will remain in this texture indefinitely without application of a voltage but is less transparent than the homeotropic texture.

Figure 4:
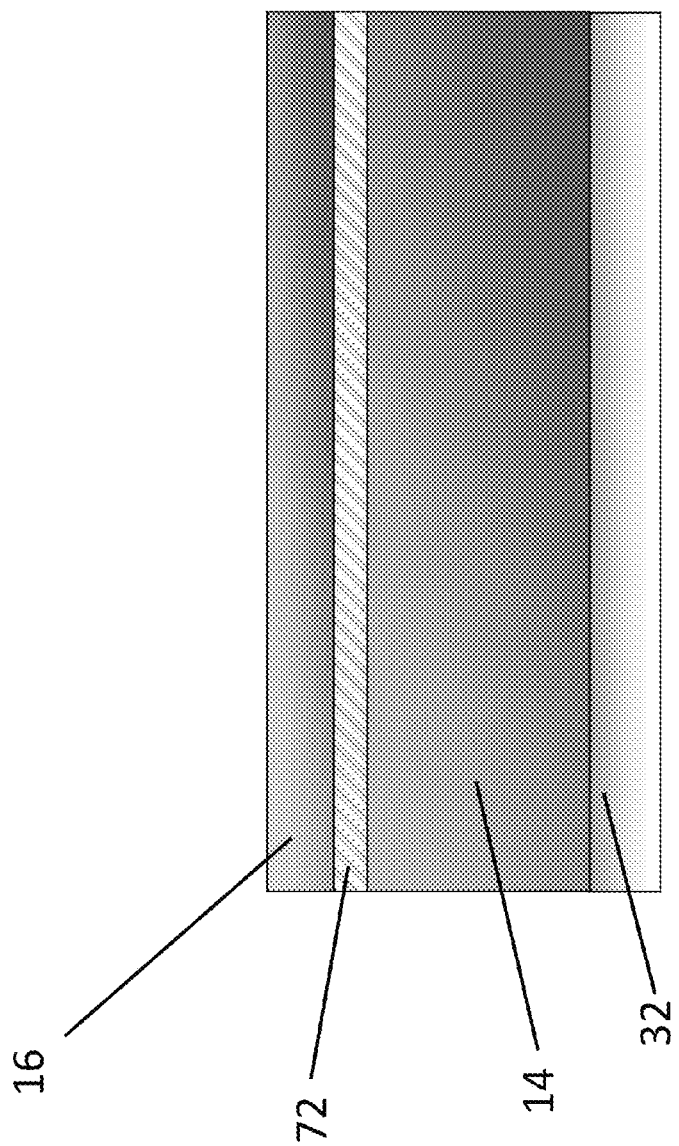
FIG. 4 is a cross-sectional side view showing optical coupling material between the display and the electronic skin.

FIG. 4 shows the electronic skin 16 placed on the electronic display 14. The exemplary electronic skin 39 can be used for the electronic skin 16. An optical coupling material 72 is disposed between, and matches the indices of refraction of the electronic skin and the display.

Figure 5:
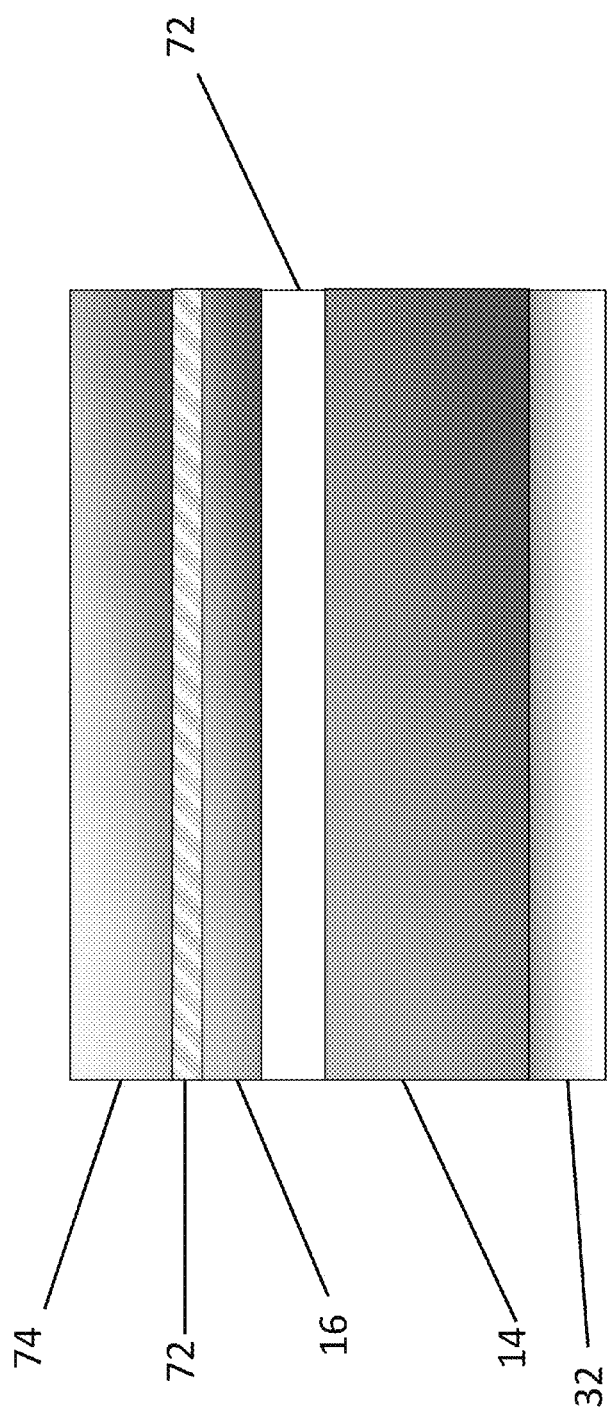
FIG. 5 is a cross-sectional side view showing an outer lens on the electronic skin and an air gap between the electronic skin and the display.

FIG. 5 shows another embodiment of the electronic skin 16 placed on the electronic display 14. The exemplary electronic skin 39 can be used for the electronic skin 16. This design employs an outer lens 74 that may be made of glass which provides protection to the electronic skin 16. An optical coupling 72 consisting of a layer of index matching material is placed between the lens 74 and the electronic skin 16. An air gap 76 separates the display device from the skin/lens coupled part. This electronic skin will have lower color saturation and lower contrast but may be more manufacturable. The embodiment of FIG. 5 may also be part of a slip-on or clip-on cover that the user can place on or remove from the handheld device. In this case the outer lens may be plastic so that it is flexible.

If it is desired to provide the electronic skin with a gray scale color, this can be achieved using the technology disclosed in U.S. patent application Ser. No. 12/152,862 entitled "Electronic Skin Having Uniform Gray Scale Reflectivity," which is incorporated herein by reference in its entirety.

Decorative Electronic Skin Example 1

A transparent electronic skin display was fabricated comprised of a triple stack of bistable polymer dispersed cholesteric liquid crystal layers as in FIG. 3. The layers were ordered such that the upper layer (closest to viewer) reflects red light; the middle layer reflects green light and the lower layer reflects blue light. The skin was made using 2 mil PET substrates each with an approximate area of $2 \times 2$ in$^2$. Transparent conducting films using conducting polymer PEDOT were coated on the substrates. Bistable cholesteric liquid crystal dispersions were made using polymerization induced phase separation (PIPS) procedure as described in U.S. Pat. No. 7,351,506. Pre-polymerized liquid mixtures were mixed with 4.0 μm spacers for lamination between substrates. The single layer was first prepared using cholesteric liquid crystal reflecting at 640 nm. A small amount of the material was placed on one substrate. A second substrate was then laminated on top with the transparent conductors in contact with the liquid crystal and then cured under a UVA lamp as described in the U.S. Pat. No. 7,351,506. The second substrate had PEDOT coated on both sides of the substrate. A second layer of PIPS mixture reflecting at a wavelength of 530 nm was laminated between the second substrate and a third substrate. The two layer display was again cured under a UVA lamp with the third substrate closest to the lamp. The third substrate also had PEDOT coated on both sides of the substrate. Finally, a third layer of PIPS mixture reflecting at a wavelength of 460 nm was laminated between the third substrate and a fourth substrate, where the fourth substrate has only one side coated with PEDOT. The three layer display was again cured under a UVA lamp with the fourth substrate closest to the lamp. The displays were cut out of the panel along an outline of the shape of the display through the substrates, liquid crystal layers and electrodes, according to U.S. Patent Application Publication No. US 2007/0277659, which is incorporated herein by reference in its entirety. Electronic interconnects were made by applying and curing conductive carbon screen print material to exposed substrate edges where the transparent conductors were exposed. AC pulses were applied across each of the layers at a voltage and pulse width necessary to drive them to the moderately transparent focal-conic texture. Each of the layers could be driven to the color reflective planar texture with a larger AC voltage pulse as is known in the art of cholesteric displays; e.g., U.S. Pat. Nos. 5,453,863 and 5,691,795, which are incorporated herein by reference in their entireties. A continuous AC voltage was applied across each layer of sufficient magnitude to drive the cholesteric material to the homeotropic texture which appeared more transparent than the focal conic texture.

Referring to FIG. 6 an electronic skin prepared as described in this example was optically coupled to an outer display surface of a laptop (Sony model PCG-4F1L) on which was placed an image of an iPhone mobile phone. The coupling material was tap water (ideally, the optical coupling material would be one that closely matches the refractive indices of the skin and the mobile phone LCD outer display surface). The LCD was switched ON and two images of the frontal face of an iPhone were displayed on the screen—one image or a mobile phone with the display turned ON another image of the same mobile phone with the display turned OFF. The image with the mobile phone display turned OFF is placed under the electronic skin and the skin electronically switched to different colors by applying voltage pulses to the appropriate electrodes for producing: red, FIG. 6(a); green, FIG. 6(b) and blue, FIG. 6(c). The colors can be mixed by driving more than one layer to the planar texture as illustrated in FIG. 6(d) where both red and blue are driven to yield magenta. While not shown in FIG. 6, a broad variety of colors are possible by mixing the various color with different shades of gray for each color as is known in the art of cholesteric displays.

The image of the mobile phone when its display is turned ON is visible through the electronic skin. The skin is turned to the homeotropic state (FIG. 6(e)). In this texture, the voltage is applied continuously as described above. There is little scattering and so the mobile phone "LCD" can be viewed clearly. If power drain is an issue, the skin can be switched to the focal-conic state and the mobile phone can still be seen (FIG. 6(f)) but only moderately well since there is some light scattering introduced by the focal conic texture.

II. Writing Tablet:

The electronic skin can be in a form of a writing tablet. When used as a writing tablet the skin is made in much the same way as the decorative skin except the cholesteric liquid crystal dispersion may be different depending upon the type of writing tablet constructed. A protective transparent polymer layer or substrate forms a writing surface and is flexible so as to be able to reduce a gap between the electrically conductive layers when writing pressure is applied to the writing surface. The circuitry enables application of voltages to the electrically conductive layers to change a texture of the liquid crystal material to be reflective or substantially transparent.

In this disclosure a writing tablet electronic skin is coupled to an existing display for use as a light absorbing medium. The conventional backlit display (such as TFT LCD, STN LCD, TN LCD, zenithal display etc.) can be turned OFF, or ON but dark, and provide a dark background to create contrast for the writing tablet. Likewise, the conventional emissive display (such as an OLED or electrofluorescent) can be turned OFF to provide a dark background to create contrast for the writing tablet. The tablet can then be used to take notes, make art work, and doodle. The tablet can be erased by application of a voltage of suitable magnitude (see U.S. Pat. No. 6,104,448) to the electrodes. The need for such a device primarily arises from the fact that in many consumer electronic devices, such as mobile phones, much of the device real estate is being taken up by the "primary display". This is usually a backlit TFT LCD. The transparent writing tablet placed directly on the display would then be ideal for taking notes while making calls etc.

Certain parts of the writing tablet can possess see-through capability while other parts can have a light absorbing layer. Some regions can even have different color absorbing layers. In other words, the writing tablet can cover more than just the primary display of a device. Alternatively, the writing tablet may cover only part of a primary display, such as on a desktop monitor as a region to take notes etc. The transparent tablet electronic skin of this disclosure may be applied to the display of any handheld or portable electronic device such as: a netbook, laptop computer, iPhone, slate computer, clam shell phone and smart phone. The transparent tablet can also be made to exhibit multiple color images with the primary colors stacked (U.S. patent application Ser. No. 12/152,729 entitled Multiple Color Writing Tablet) but with the back light absorbing layer (black layer) removed.

Portions of the following discussion have been excerpted from co-pending U.S. patent application Ser. No. 12/220,805, entitled Selectively Erasable Electronic Writing Tablet, which is incorporated herein by reference, so as to provide an understanding of how the inventive electronic skin on a display functions as a writing tablet that can be written on and selectively erased.

A. Single Layer Writing Tablet

Figure 7:
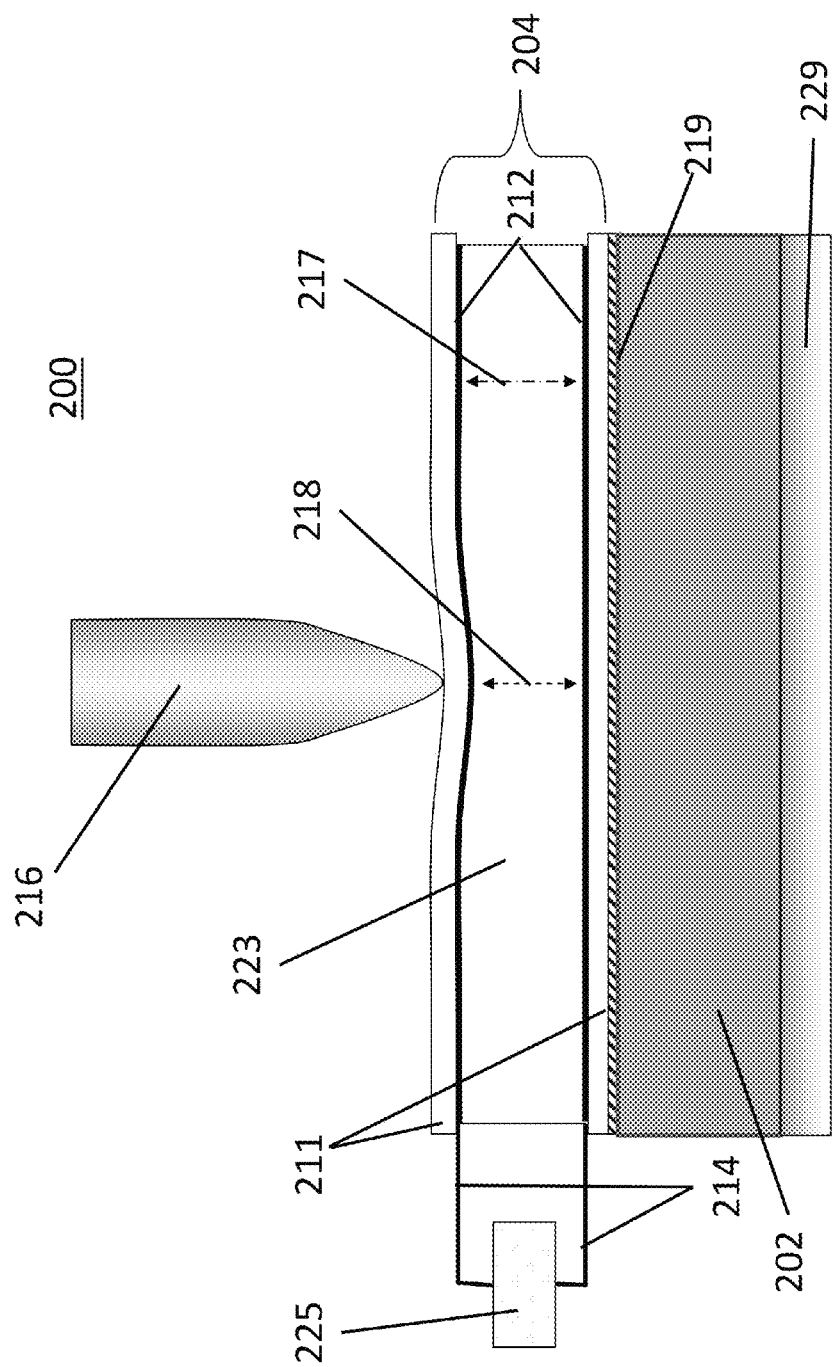
FIG. 7 is a cross-sectional side view of a single liquid crystal layer writing tablet electronic skin according to this disclosure overlayed on a backlit display.

1. Focal Conic Writing on a Planar Background, Mode A:

One embodiment is the electronic skin as a selectively erased writing tablet in which the background state is the planar texture and the line created by the pressure of the stylus during application of voltage is in the focal conic texture. The line can be selectively erased by simply retracing it with the stylus with no voltage applied. The device 200 is an electronic display 202 with overlayed bistable, cholesteric writing tablet electronic skin 204 and is illustrated in FIG. 7. The electronic skin includes transparent substrates 211 of flexible material, plastic being preferred. The inner surfaces of the substrates are coated with transparent electrically conductive layers or electrodes 212 (preferably unpatterned but possibly patterned) from materials such as indium tin oxide (ITO) or a conducting polymer such as PEDOT. Sandwiched between the adjacent electrodes is a bistable cholesteric liquid crystal material 223. The layer 219 is an optical coupling material that matches the indices of refraction of the outer surface of the electronic display 202 and the rear substrate of the electronic skin 211. The electronic skin overlies the electronic display 202 which has a backlight 229.

In this embodiment in which the liquid crystal is initially in the planar texture, the image is created by the unique electro-optic characteristics of the cell. The conductive electrodes 212 are connected with electrical interconnects 214 to electronic circuit 225 that provides suitable voltages to the conductive electrodes 212, usually in the form of voltage pulses, in order for pressure of the stylus to create an image. The circuit 225 is first switched to operate in Mode A (focal conic writing on a planar background) and then the user can select the various functions; write, select erase, or full erase.

Figure 8:
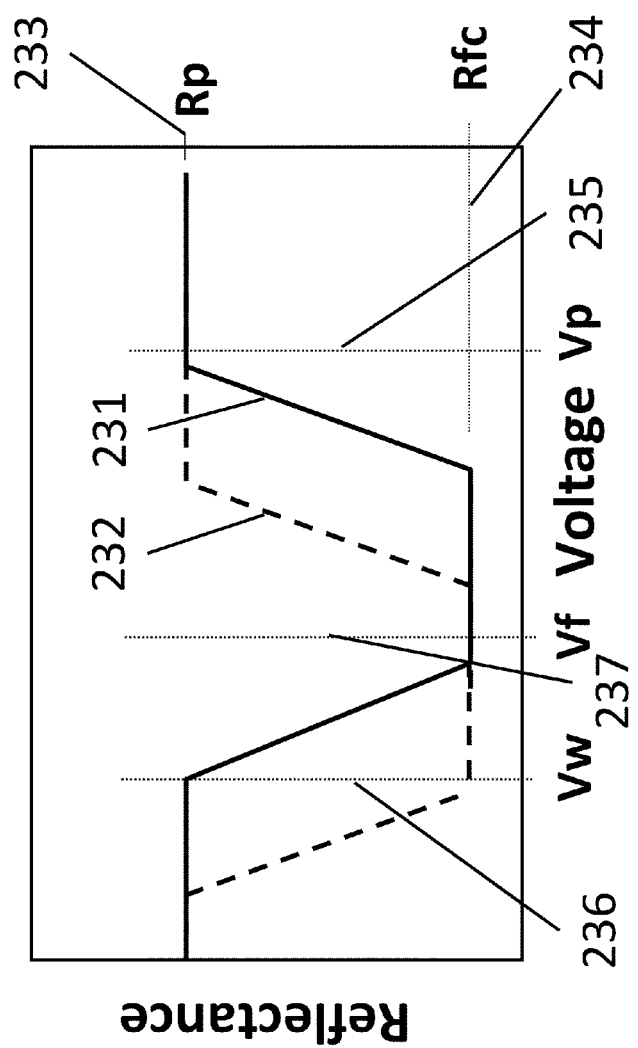
FIG. 8 is a graph showing a representative curve of reflectance as a function of voltage that approximates the performance of a writing tablet electronic skin of the this disclosure.

In order to explain the operation of the circuit 225 of FIG. 7 we turn to FIG. 8. FIG. 8 is an illustration of a typical voltage response shown as the Reflectance of the cell versus the Voltage of a pulse applied to the cell (shown in a form that is more uniform than an actual voltage response curve). There are two curves illustrated in the voltage response of FIG. 8: a solid curve 231 for the cell having an undepressed cell gap 217 and a dashed curve 232 for regions of the cell having a reduced cell gap spacing 218 (the undepressed and reduced cell gaps being shown in FIG. 7). In both the solid 231 and the dashed 232 curves of FIG. 8, the maximum light reflectance of the planar texture is indicated by Rp 233 whereas the minimum light reflectance of the focal conic texture is indicated by Rfc 234. The reflectance of the gray scale texture is between Rp and Rfc. As illustrated in FIG. 8 the effect of the pressure from the stylus is to shift the voltage response from the solid curve 231 to the dashed curve 232.

The cholesteric liquid crystalline dispersions used for Mode A may be of the type prepared by polymerization induced phase separation (PIPS) such as described in U.S. Pat. No. 7,479,940 or prepared with emulsions such as described in U.S. Pat. No. 7,170,481, both of which are incorporated herein by reference in their entireties.

i. Mode A Full Erase:

The procedure of writing an image on the inventive cell in Mode A is to first fully erase all previous images by selecting the "Mode A full erase" function of the circuit 225. This applies an erasing voltage of value Vp indicated by vertical line 235 to drive the entire cell initially to the planar texture. The value of the voltage or magnitude of a voltage pulse to do this is well known in the art of a bistable cholesteric liquid crystal displays; e.g., U.S. Pat. Nos. 5,453,863 and 5,691,795, which are incorporated herein by reference in their entireties. This erases the writing tablet to the reflective planar texture so that the background color of the writing tablet is a color additive mixture of the reflective color of the cholesteric material 223 with any color of the back display of FIG. 7. In addition, it is understood that one might want to achieve a gray scale planar texture for full erase; therefore one can apply a Mode A full erase by erasing with a voltage value of V<Vp as indicated by the vertical line 35 in FIG. 8.

ii. Mode A Write

In order to write an image using stylus 216, one activates the "Mode A write" function on the circuit 225 such that a voltage, Vw, is applied to the writing tablet. The value of Vw is indicated by vertical line 236 of FIG. 8. The voltage is applied for the duration of the stylus write; preferably a continuous AC voltage or a sequence of bipolar pulses. The voltage is applied to the patterned or unpatterned electrodes so that the entire display area of liquid crystal seen by the user of the writing tablet has an electric field applied to it. It is seen by curve 232 in FIG. 8 that a voltage Vw 236 will drive the area of the cell being written on to the focal conic texture; that is, areas of the cell under the stylus where pressure is applied and cell gap is reduced. The planar texture in that area is driven to the focal conic as illustrated by the dashed curve 232. In the remainder of the cell where the cell gap is not disturbed (e.g., regions 217), even though the electric field has been applied here, the material will remain in the planar texture as indicated by the solid curve 231, leaving a planar background for the focal conic written portion. In other words, the liquid crystal material where the cell gap is undisturbed remains in the planar texture as shown where line Vw intersects the solid line 231 (undepressed cell gap) while the voltage Vw is applied to the electrodes, and is not converted to the focal conic texture. The circuit 225 can fully erase any image by selecting the "Mode A full erase" function to provide a planar erase voltage Vp 235 to the tablet. It is seen by FIG. 8 that a voltage Vp 235 will drive the entire cell to the planar texture, erasing the focal conic writing. The voltage may be an AC voltage pulse or a sequence of pulses, preferably bipolar pulses. In addition, one may desire to write a gray scale planar texture by applying a voltage during the write of V<Vw as line 236 indicated in FIG. 8.

iii. Mode A Select Erase:

In order to selectively erase an image using stylus 16, one activates the "Mode A select erase" function on circuit 225 such that no voltage is applied to the writing tablet. When a focal conic line is retraced with the stylus in select erase mode, the liquid crystal is displaced from the region under the stylus and is induced to flow from the focal conic texture to the planar texture. Thus, a focal conic line can be selectively or partially erased by applying pressure on an erasing region overlying the written portion for only a part of that line, which leaves the focal conic line where pressure was not applied. The selectively erased planar texture blends with the switched planar texture of the background such that the erased line does not contrast. The switched planar texture may be slightly different compared to the selectively erased planar texture, which favors judicious use of select erase or closely tracing the image when selectively erasing to avoid large selectively erased areas on the writing tablet where the differences may become more noticeable; the same is true for the switched focal conic texture compared to the selectively erased focal conic texture. To reduce contrast and to have the selectively erased region better match the background it might be preferable to have the planar texture background switched, for example, to a 95% gray scale planar texture.

References to writing "on a background" used in this disclosure means writing a color line on the writing tablet electronic skin in which a majority of the display area has the background color or is black, and does not mean that the background must be physically behind the writing or formed by a color of the rear display. When the word "image" is used in this disclosure it means any black or color line and any black or color background on the writing tablet electronic skin. When we say "selecting a cell" or "writing on a cell" in this disclosure, that means selecting the writing color to include the color reflected by that cell.

2. Planar Writing on a Focal Conic Background, Mode B:

In this embodiment in which the liquid crystal is initially in the focal conic texture, flow of the liquid crystal is required to form the planar texture using the pressure of a stylus, without application of a voltage, in order to write. The image is created by the flow of the liquid crystal to the planar state. In order for flow to occur, special cholesteric liquid crystal dispersions are necessary in which the droplets are interconnected or there are no discrete or defined droplets but only an interconnected network in which liquid crystal can flow as described in published U.S. patent application Pub. Number: US 2009/0033811, which is incorporated herein by reference in its entirety. The conductive electrodes 212 are connected with electrical interconnects 214 to electronic circuit 225 that provides suitable voltages to the conductive electrodes 212, usually in the form of a pulse, in order to selectively or fully erase an image. The circuit 225 is first switched to operate in Mode B (planar writing on a focal conic background) and then the user can select the various functions; write, select erase, or full erase.

In order to explain the operation of the writing circuit 225 of FIG. 7 we refer to FIG. 8.

i. Mode B Full Erase:

The procedure of writing an image on the inventive cell in Mode B is to first fully erase all previous images by selecting the "Mode B full erase" function of the circuit 225. This applies an erasing voltage of value Vf indicated by vertical line 237 to drive the entire cell initially to the focal conic texture. The value of the voltage or magnitude of a voltage pulse to do this is well known in the art of a bistable cholesteric liquid crystal displays; e.g., the U.S. Pat. Nos. 5,453,863 and 5,691,795. This erases the writing tablet electronic skin to the transmissive focal conic texture so that the background (black or a backcolor) of the writing tablet electronic skin is due to the preferably dark back display 202 of FIG. 7.

ii. Mode B Write:

In order to write an image using stylus 16 in Mode B, one activates the "Mode B write" function on the circuit 225 such that no voltage is applied to the writing tablet. In Mode B, which is disclosed in prior art such as the U.S. Pat. No. 6,104,448, the stylus creates a colored planar texture line on a transparent focal conic background. Contrast in the writing pad is created between the transparent focal conic texture which shows the back-display (typically black) and the reflective (color) planar texture of the cholesteric liquid crystal. The write circuit 225 can fully erase any image by selecting the "Mode B full erase" function to provide a focal conic erase voltage Vf 237 to the tablet. It is seen by FIG. 8 that a voltage Vf 237 will drive the entire cell to the focal conic texture, erasing the planar writing. The voltage may be an AC voltage pulse or a sequence of pulses, preferably bipolar pulses.

iii. Mode B Select Erase:

In order to selectively erase an image using stylus 216, one activates the "Mode B select erase" function on circuit 225 such that a voltage Vw 236 is applied to the writing tablet. The voltage is applied for the duration of the pressure applied by the stylus; preferably a continuous AC voltage or a sequence of bipolar pulses. The voltage is applied to the patterned or unpatterned electrodes so that the entire display area of liquid crystal seen by the user of the writing tablet, has an electric field applied to it. It is seen by curve 232 in FIG. 8 that a voltage Vw 236 with applied pressure will selectively erase by driving that area of the cell to the focal conic texture; that is, areas of the cell under the stylus where pressure is applied and cell gap is reduced. The planar texture in that area is driven to the focal conic as illustrated by the dashed curve 232. In the remainder of the cell where the cell gap is not disturbed, even though the electric field has been applied there, writing on the cell in which the material is in the planar texture remains planar as indicated by the solid curve 231, leaving a focal conic background for the planar written portion. In other words, the planar writing where the cell gap is undisturbed remains in the planar texture as shown where line Vw intersects the solid line 231 (undepressed cell gap) while the voltage Vw is applied to the electrodes and is not converted to the focal conic texture. The regions of the writing tablet that are selectively erased to the focal conic texture blend with the switched focal conic texture of the background such that the erased line does not contrast.

Figure 9:
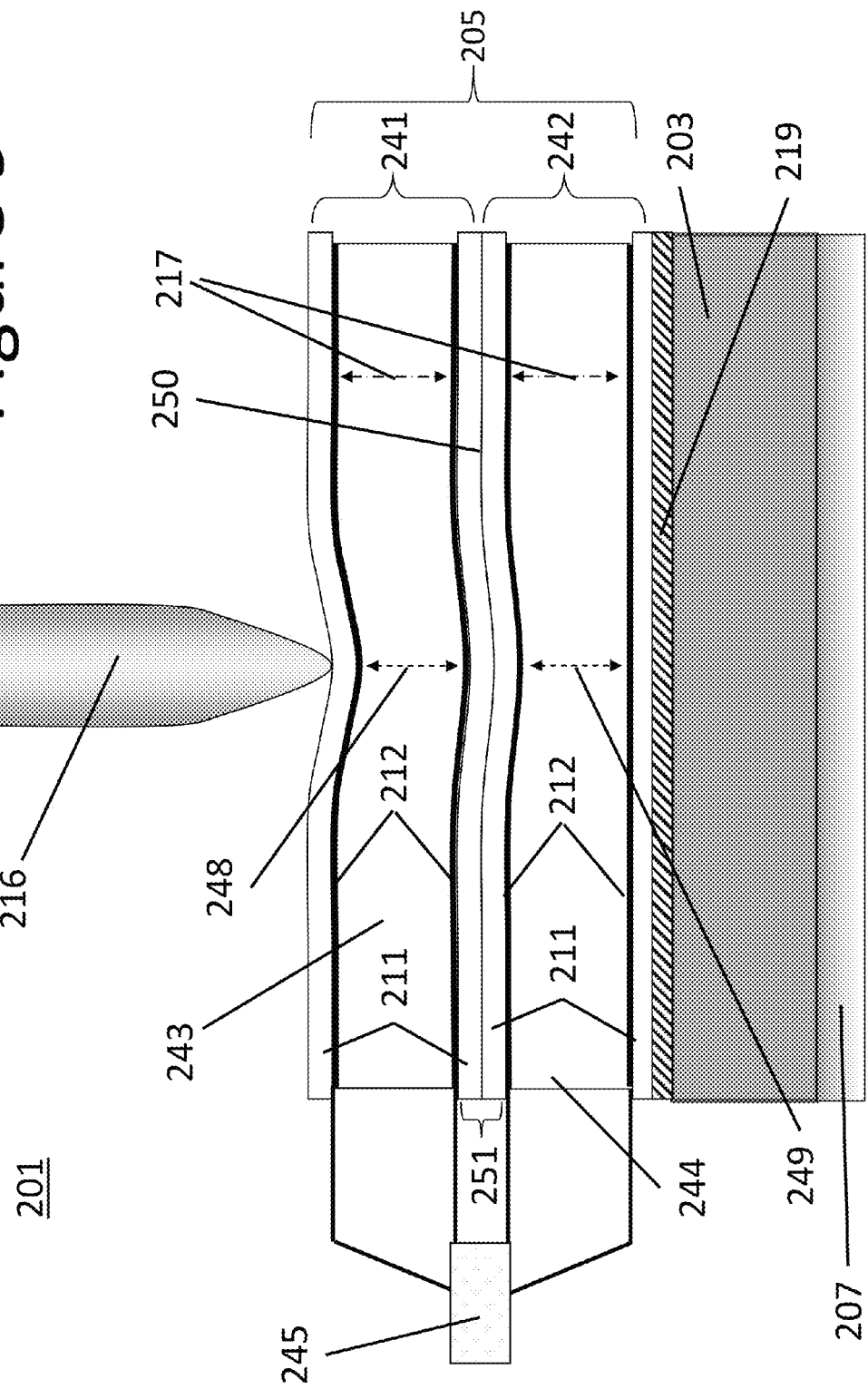
FIG. 9 is a cross-sectional side view of a double liquid crystal layer writing tablet electronic skin according to this disclosure overlayed on a backlit display.

B. Double Layer Writing Tablet:

We now turn to another embodiment of this disclosure featuring a device 201 including an electronic display 203 with overlayed multiple-color writing tablet electronic skin 205 in which two electro-optic layers are stacked over each other (FIG. 9). The electronic display includes a backlight 207. The electro-optic layers can be stacked such that each cell reflects a different planar reflective color and images can be written separately on each cell with a single stylus to create multiple color images on the writing tablet. Primary colors can be mixed to create a variety of colors subject to the innovation of the user. The writing tablet electronic skin enables a single untethered stylus to write or draw figures in different colors as selected by the user. Writing of different colors can be achieved in at least two ways: a first Mode A in which planar color writing is presented on a planar texture background (by writing in the focal conic texture); and a second Mode B in which planar texture color writing is presented on a focal conic background, preferably black. Each of these modes works on a different physical principle of the cholesteric liquid crystal and will be described separately below.

The double cell writing tablet device can be made with either stacked separate cells or as a single unit sharing substrates. In FIG. 9, completed cells 241 and 242 comprising different color electro-optic layers can be stacked as separate units and joined with an index matching material 250 in between (matching the index of refraction of the adjacent transparent substrates). Alternatively, the stacked structure can be made as a single unit that shares a common substrate between the adjacent electro-optic layers 243 and 244 where the inner component structure 211, 250, and 211 becomes a single shared substrate 251 with two electrodes 212 disposed on either side (also including an upper and a lower substrate 211 and an upper and a lower, outer electrically conductive layer 212 sandwiching liquid crystal 243 and 244, respectively, adjacent the component structure).

1. Double Layer Writing Tablet: Focal Conic Writing on a Planar Background, Mode A:

In describing Mode A, we refer to FIG. 9 which is an illustration of a writing tablet electronic skin having double stack cells. The multiple-color double-stack tablet electronic skin of FIG. 9 is made up of two cells, cell 241 stacked on top of cell 242. Cell 241 is of the same construction as the cell of FIG. 7 containing transparent substrates 211 with transparent conductive electrodes 212; however it is not disposed on the display and is connected to single circuit 245. The substrate 211 most proximal to the viewer forms a writing surface. The substrates 211 are flexible. Cell 241 is stacked on top as well as optically coupled at 250 to cell 242 so as to match the index of refraction of adjacent substrates. One means of optical coupling is with a thin layer of optical index matching fluid 250 between cells 241 and 242. Cell 242 is also identical in construction to the cell of FIG. 7 with transparent substrates 211 and transparent conductive electrodes 212; however, the electrodes of both cell 242 and cell 241 are electrically connected to the same circuit 245. The circuit 245 is first switched to operate in Mode A (writing by forming a focal conic texture on a planar background in the cell) and then the user can select the various writing functions; write only cell 241, write only cell 242, write both cells 241 and 242, selectively erase both cells 241 and 242, or full erase.

Cells 241 and 242 are filled with a cholesteric liquid crystal material 243 and 244, respectively. However, the cholesteric material within each cell has a different reflective color than the other cell. For example, liquid crystal 243 may be a cholesteric material that reflects blue light while liquid crystal 244 reflects yellow light. In certain applications it may be desired that liquid crystal materials 243 and 244 have a different handedness for the helical twist; that is, one cell reflects right handed circular polarization and the other left. Like the cholesteric material 223 of FIG. 7, the cholesteric materials 243 and 244 of FIG. 9 are preferred to be in the form of a polymeric dispersion. Materials in a stacked cell assembly such as 243 and 244, are a droplet dispersion in which the droplets are either confined or unconfined with interconnecting droplets so that flow can affect its operation. The dispersions may be of the type prepared by polymerization induced phase separation or emulsions as is known in the art.

i. Full Erase, Mode A:

A procedure of writing a multicolor image on the double stack select erase tablet in Mode A is to first switch the circuit 245 to "Mode A full erase" function such that all previous images in both layers are planar erased by applying voltages of value Vp indicated by vertical line 235 (FIG. 8) to drive both cells 241 and 242 entirely into the planar texture. The voltage may be an AC voltage pulse or a sequence of pulses, preferably bipolar pulses. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet electronic skin to the reflective planar texture so that the background color of the writing tablet is a color additive mixture of the reflective colors of the cholesteric materials 241 and 242 and any color of the back display. The back display is preferably dark.

ii. Write Only Cell 241, Mode A:

In order to write an image of the color of the cholesteric 243 on the top cell 241 by stylus 216 in Mode A, the circuit 245 is switched to "Mode A write only cell 241" function such that a voltage Vw is applied by the circuit 245 to the bottom cell 242 while no voltage is applied to the top cell 241 during the writing process. The value of Vw is indicated by vertical line 236 of FIG. 8. The voltage is applied for the duration of the stylus write; preferably a continuous AC voltage or a sequence of bipolar pulses. It is seen by curve 232 FIG. 8 that a voltage Vw 236 will drive the bottom cell to the focal conic texture only in the vicinity of the stylus where pressure is applied and the cell gap is reduced. This removes the planar texture of the liquid crystal 244 from the bottom cell 242 under the stylus (i.e., in reduced gap regions). In the remainder of the bottom cell 242 where the cell gap is not disturbed, the material will remain in the planar texture as indicated by the solid curve 231. Because no voltage is applied to the electrodes for the upper cell 241, the liquid crystal 243 of the upper cell is not changed from the planar texture. This forms an image composed of a written portion (region where pressure is applied by the stylus to the writing surface) containing only the reflected light of the color of the cholesteric 243 of top cell 241 (added with any color of the back display, referred to throughout this disclosure as a "back color") on a background color (formed by the undepressed (unwritten) regions of both cells) that is an additive mixture of the colors of the planar textures of both cells (along with any back color).

iii. Write Only Cell 242, Mode A:

In order to write an image of the color of the cholesteric liquid crystal 244 of the bottom cell 242 by stylus 216 in Mode A, the circuit 245 is switched to "Mode A write only cell 242" function such that a voltage Vw is applied by the write circuit 245 to the electrodes of the top cell 241 and no voltage is applied to electrodes of the cell 242 while the writing pressure is applied to the writing surface. The value of Vw is indicated by vertical line 236 of FIG. 8. The voltage is applied for the duration of the stylus write; preferably a continuous AC voltage or a sequence of bipolar pulses. It is seen by curve 232 of FIG. 8 that a voltage Vw 236 will drive the cholesteric 243 of the top cell 241 to the focal conic texture in the vicinity of the stylus where pressure is applied (i.e., at the written portion of the writing tablet) as the cell gap is reduced. In the remainder of the top cell where the cell gap is not disturbed, the material will remain in the planar texture as indicated by the solid curve 231. Therefore, the image will be composed of the written portion formed by colored light reflected from the planar texture of the cholesteric 244 of only the bottom cell 242 (added to any back color of the back display). The written portion will be apparent on a background color (formed by the undepressed regions of both cells) that is an additive mixture of the colors of the planar textures of both cells (along with any back color).

iv. Write Both Cells 241 and 242, Mode A:

In order to write by forming the focal conic texture that exhibits the back color of the back display on the planar background of Mode A, the circuit 245 is switched to "Mode A write both cells 241 and 242" function such that a voltage Vw is applied by the write circuit 245 to both the top cell 241 and bottom cell 242 while the writing pressure is applied to the writing surface. The value of Vw is indicated by vertical line 236 of FIG. 8. The voltage is applied for the duration of the stylus write; preferably a continuous AC voltage or a sequence of bipolar pulses. It is seen by curve 232 FIG. 8 that a voltage Vw 236 will drive the cholesteric liquid crystal of both cells to the focal conic texture in the vicinity of the stylus where pressure is applied (i.e., at the written portion of the writing tablet) as the cell gap is reduced. In the remainder of both cells where the cell gap is not disturbed, the material will remain in the planar texture as indicated by the solid curve 231. The image will be composed of the written portion formed by the back color on a background color (formed by the undepressed regions of both cells) that is an additive mixture of the colors of the planar textures of both cells (along with the back color).

v. Selectively Erase Both Cells 241 and 242, Mode A:

A mistake or change in writing can be locally corrected or made in a stacked cell assembly much the same way it is done in a single cell writing tablet; that is, over-writing to produce the background where the written portion was. In this disclosure we define the word erase to mean: removing the written image by restoring the original background color. In a stacked cell assembly, one would not, with this definition, selectively erase only cell 241 without perturbing the image that was already recorded into cell 242 and vice-versa. A mistake or change is locally corrected or made by selectively erasing both layers simultaneously by restoring the written portion to the background color. In order to selectively erase both cells 241 and 242 in Mode A, the circuit 245 is switched to "Mode A selective erase both cells 241 and 242" function such that no voltage is applied by the write circuit 245 to either the top cell 241 or the bottom cell 242 while the writing pressure is applied to the writing surface to retrace the previously written focal conic lines and flow (erase) them to a planar state. The selectively erased planar texture blends with the switched planar texture of the background such that the erased line does not contrast. For example, if an image is composed of only the planar texture of cell 241 (with cell 242 being focal conic in the written portion), retracing the written portion without applied voltage places the focal conic regions of cell 242 in the planar texture. The region of the previously written portion is selectively erased to that of the planar texture on both cells and does not contrast with the switched planar background of both cells.

2. Double Layer Writing Tablet: Planar Writing on a Focal Conic Background, Mode B:

In describing Mode B, we again refer to FIG. 9. The writing tablet electronic skin is identical to that described above except that the initial state of both cells is focal conic and the cholesteric materials are in the form of a polymeric dispersion that will allow localized flow caused by the writing pressure from a pointed instrument such as a pointed untethered stylus to induce the planar texture. Droplets that are unconfined or are interconnecting allow liquid crystal flow to occur under the pressure of the stylus 16 in reduced cell gap regions 248 and 249. Flow does not occur and the liquid crystal texture does not change in undepressed regions 217. The pressure from the pointed stylus 216 in the locally reduced cell gap spacing 248, 249 induces flow in the cholesteric material that changes the cholesteric texture from the transparent focal conic to the color reflective planar texture in the vicinity of the tip of the stylus 216. The stylus is used to draw an image similar to drawing with a pencil on paper. The written image can then be entirely erased by applying a voltage pulse to the electrodes of sufficient value to drive all the material 213 to the focal conic state (see FIG. 8 and the '448 patent for suitable voltage to apply to each liquid crystal layer). The circuit 245 is first switched to operate in Mode B (a cell having planar writing on a focal conic background) and then the user can select the various writing functions; write only cell 241, write only cell 242, write both cells 241 and 242, selectively erase both cells 241 and 242, or full erase.

i. Full Erase, Mode B:

The procedure of writing an image on the inventive cell in Mode B is to first fully erase all previous images by selecting "Mode B full erase" such that the write circuit 245 erases both layers to the focal conic by applying a voltage Vf 237 to both of cells 241 and 242. The value of the voltage or magnitude of a voltage pulse to do this is well known in the art of bistable cholesteric liquid crystal displays; e.g., U.S. Pat. Nos. 5,453, 863 and 5,691,795. When viewed from above, the tablet electronic skin will exhibit the back display (back color or black) since the focal conic texture is essentially transparent in this cell configuration. Black or blue are often preferred for the back color.

ii. Write Only Cell 241, Mode B:

In order to write an image reflecting the color of the cholesteric liquid crystal 243 on the top cell 241 only using stylus 16 "Mode B write only cell 241" function is selected such that a voltage Vw is applied by the write circuit 245 to the electrodes of the bottom cell 242 during the writing process but no voltage is applied to the electrodes of the top cell 241. The value of Vw is indicated by vertical line 236 of FIG. 8. The voltage is applied for the duration of the stylus write; preferably a continuous AC voltage or a sequence of bipolar pulses. The purpose of the voltage is to maintain the focal conic texture of the bottom cell 242 under the action of the stylus (i.e., prevent forming the planar texture in the written portion or depressed cell gap region of the bottom cell). While this voltage is applied the pressure of the stylus does not induce a planar texture in cell 242 but maintains its focal conic texture during the writing process. The stylus does, however, induce a planar texture in the cholesteric 243 of the upper cell 241 in its vicinity (i.e., in the writing portion) that is believed to be due to lateral flow of the cholesteric liquid crystal in the reduced gap regions resulting in the focal conic texture being transformed to the planar texture. This occurs without any voltage being applied to the upper cell. Therefore, an image on a focal conic background on a stacked multicolor cell is possible by suitably applying a voltage to allow the image to be written on only one cell. The image is composed of the writing portion at a color of the light reflected from the planar texture of the cholesteric liquid crystal 243 of the top cell 241 (added to any back color of the back display) on the unwritten and undepressed background (black or a back color of the back display).

iii. Write Only Cell 242, Mode B:

Similarly, in order to form an image on the bottom cell 242 only by stylus 216 "Mode B write only cell 242" function must be selected such that a voltage Vw must be applied by the write circuit 245 to the electrodes of the top cell 241 during the writing process but no voltage is applied to the electrode of the bottom cell 242. As before, both cells are initially in the focal conic texture. The value of Vw is indicated by vertical line 236 of FIG. 8. The voltage is applied for the duration of the stylus write; preferably a continuous AC voltage or a sequence of bipolar pulses. The purpose of the voltage is to maintain the focal conic texture of the top cell 241 under the action of the stylus. While this voltage is applied the pressure of the stylus does not induce a planar texture in top cell 241 but maintains its focal conic texture from the erasure process. The stylus does, however, induce a planar texture in the bottom cell 242 due to induced lateral flow of the cholesteric liquid crystal (without applying voltage to the bottom cell), resulting in the focal conic texture being transformed to the planar texture in the reduced cell gap region of the bottom cell (i.e., in the written portion). This produces an image composed of the writing portion at a color of the light reflected from the planar texture of the cholesteric 244 bottom cell 242 (added to any color of the back display) on the unwritten and undepressed background (black or a back color of the back display).

iv. Write Both Cells 241 and 242, Mode B:

In order to write on both stacked cells in Mode B, the circuit 245 is switched to "Mode B write both cells 241 and 242" mode such that no voltage is applied by the write circuit 245 to either the top cell 241 or the bottom cell 242 while the writing pressure is applied to the writing surface. The stylus does, however, induce a planar texture in the cholesterics 243 and 244 of both cells 241 and 242 in its vicinity (i.e., in the writing portion) that is believed to be due to lateral flow of the cholesteric liquid crystal in the reduced gap regions resulting in the focal conic texture being transformed to the planar texture. This occurs without any voltage being applied to the cells by the circuit 245. The image is composed of the writing portion at a color of the light reflected from the planar texture of the cholesteric liquid crystal 243 added to the light reflected from the planar texture of the cholesteric liquid crystal 244 (added to any back color of the back display) on the unwritten and undepressed background (black or a back color of the back display).

v. Selective Erase Both Cells 241 and 242, Mode B:

A mistake or change in writing can be locally corrected or made in a stacked cell assembly much the same way it is done in a single cell writing tablet; that is, over-writing to produce the background where the written portion was. Again, the word erase means removing the written image by restoring the original background color. In a stacked cell assembly, one would not, with this definition, selectively erase only cell 241 without perturbing the image that was already recorded into cell 242 and vice-versa. A mistake or change is locally corrected or made by selectively erasing both layers simultaneously by restoring the written portion to the background color. In order to selectively erase both cells 241 and 242 in Mode B, the circuit 245 is switched to "Mode B select erase both cells 241 and 242" function such that a voltage Vw is applied by the write circuit 245 to the electrodes of the both cells 241 and 242 during the writing process. The value of Vw is indicated by vertical line 236 of FIG. 8. The voltage is applied for the duration of the stylus write; preferably a continuous AC voltage or a sequence of bipolar pulses. The purpose of the voltage is to form the focal conic texture in both cells 241 and 242 under the action of the stylus (i.e., replace the planar texture in the written portion or depressed cell gap region of the bottom cell). The region in which the planar texture has been selectively erased to the focal conic texture blends with the switched focal conic texture of the background such that the erased line does not contrast.

3. Double Layer Writing Tablet: Any Color on Any Color Background, Multimode:

The inventive writing tablet electronic skin can also be designed so that one of the cells operates according to Mode A and the other cell operates according to Mode B. That is, one cell has an initial planar texture while the other cell has the initial focal conic texture. Writing in a color of only one of the cells (added to any back color) is selected by applying the write voltage Vw to the other cell while writing pressure is applied. The background will have the color of the undepressed regions of the planar cell (added to any back color). For example, when a first cell desired to be selected is in the initial focal conic texture, the other second cell in the initial planar texture has the writing voltage Vw applied during the writing process. The planar texture is erased from the second layer in the written portion where the cell gap is reduced, as Vw is applied. The writing process forms the planar texture in the written portion of the first layer where the cell gap is reduced. The resulting image will be the written portion at the planar texture of the first layer only (added to any background color) on a background formed by the planar texture of undepressed regions of the second layer (added to any background color).

Another way to form an image on the multimode, two layer writing tablet electronic skin is by applying the write voltage to both cells, in effect, selecting the back color. Upon writing, the planar texture is prevented from being formed in the written portion of the focal conic layer and the planar texture is erased to the focal conic in the written portion of the planar layer. This forms an image composed of a written portion in black or any back color on a background of the color reflected by the planar layer (added to any back color).

Yet another way to form an image on the multimode, two layer writing tablet electronic skin is by not applying the write voltage to either layer. The writing process will form the planar texture in the written portion of the initially focal conic layer and will not affect the planar texture existing in the written portion of the other initially planar layer. This will result in an image that is the addition of the colors reflected from both layers in their written portions (along with any back color) on a background that is the color of light reflected from the planar layer (added to any back display color).

The writing tablet can be made to produce white on black or black on white using a two cell writing tablet reflecting blue and yellow and having a black back display. To produce white on black, Mode B is used (both cells are initially in the focal conic state) and no write voltage is applied. This results in the written portion being white (additive mixing of the blue and yellow colors reflected from both cells) on the black back display seen through the undepressed regions of both cells. To produce black on white, Mode A is used; both cells are initially in the planar texture. During the writing process, the write voltage is applied to both cells. This results in written portions of both cells being focal conic, which shows the black back display on a background that is white (the additive mixture of the blue and yellow reflected colors).

To selectively erase in the multimode configuration, circuit 245 must be able to retain information of the original color of the multimode. In doing so, the voltages for each layer are adjusted accordingly. For example, in a blue and yellow double layer writing tablet if one chooses a blue background color and one wants to selectively erase a line back to the blue background color, one simply retraces the written line while circuit 245 applies no voltage to the blue layer and Vw to the yellow layer. The multimode select erase simply reproduces the original color of the multimode background selection.

C. Multilayered Writing Tablets Composed of More than Two Layers:

1. General

It will be understood that the select erase capability of this disclosure applies to device 208 including a display device 209 with overlayed writing tablet electronic skin 206 having three or more stacked cholesteric liquid crystal layers. The display device 209 includes a backlight 213. Written portions are formed on the writing tablet in Mode A, Mode B or Multimode in the three electro-optic layer writing tablet electronic skin in the manner disclosed in the Ser. No. 12/152,729 entitled Multiple Color Writing Tablet, which is incorporated herein by reference in its entirety. However, the back display takes the place of the back light absorbing layer described in the three layer display of that Ser. No. 12/152,729 and provides the black or colored back color described in that application. One skilled in the art will understand in reading this disclosure that this writing can be selectively erased as described herein, particularly with regard to the double layer stacked display. In all cases the written portions, formed in any manner described in the Ser. No. 12/152,729, are selectively erased by returning the written portion texture to a texture similar to the switched initial texture of the background whereby contrast in minimized.

In all embodiments of this disclosure, all of the substrates and electrically conductive layers (e.g., electrodes) are optically transparent. The electrically conductive layers preferably have their indices of refraction matched to the substrates and, when the substrate component is used, the adjacent substrates have their indices of refraction matched to each other with the index matching material.

The electronic circuits (e.g., 225, 245, 321, 322 and 323) are designed to provide voltages and voltage pulses so as to carry out the operation of Mode A, Mode B and/or Multimode and the various functions described in this disclosure for one or more electro-optic cholesteric liquid crystal layers. This circuitry design is well within the ability of one of ordinary skill in the art in reading this disclosure. Therefore, only the voltage and voltage pulse required have been described above and in the examples. The electronic circuits may be incorporated in the cell phone or other display containing device.

2. Triple Cell Writing Tablet

Figure 10:
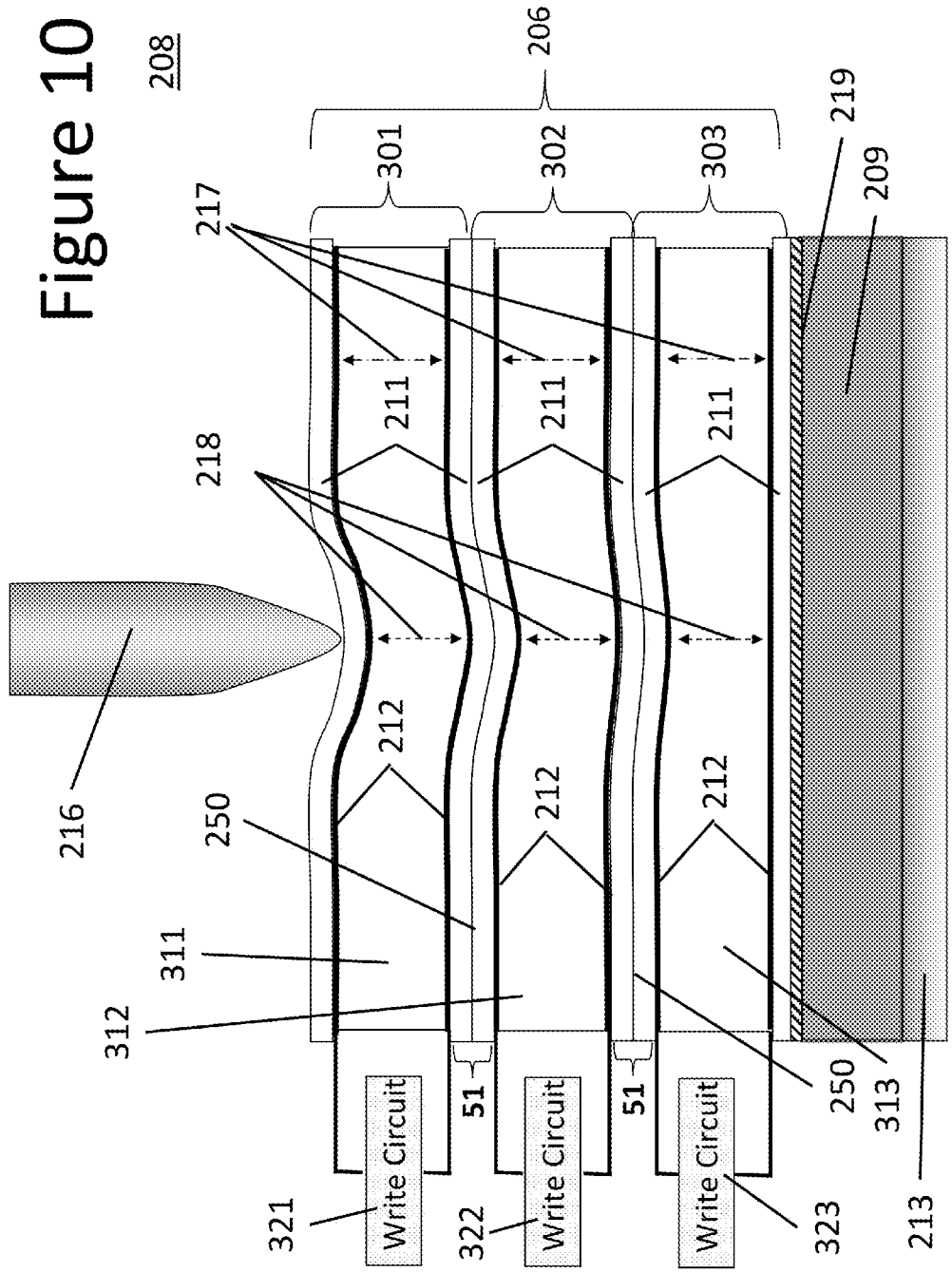
FIG. 10 is a cross-sectional side view of a triple liquid crystal layer writing tablet according to this disclosure overlayed on a backlit display.

Portions of the Ser. No. 12/152,729 have been excerpted here to provide an understanding of how images can be formed in multiple colors on multiple stacked cholesteric liquid crystal layers of the writing tablet overlayed on the display. We now turn to FIG. 10 where we disclose a triple stack multicolor writing tablet electronic skin overlayed on a display. The triple-stack writing tablet electronic skin 206 of FIG. 10 is made up of cells 301, 302 and 303 stacked as illustrated. Cells 301, 302 and 303 contain transparent substrates 211 with transparent conducting electrodes 212, each connected to a writing circuit. Cell 303 is supported by the back display. Cell 301 is stacked on top of cell 302 which is in turn stacked on top of cell 303 as illustrated in FIG. 10. It is preferred that cells all be optically coupled such as by incorporating a thin layer of optical index matching fluid between cells 301 and 302 and between cells 302 and 303. Optical matching material 219 is also disposed between the rear or distal substrate 211 and the display surface. Cells 301, 302 and 303 are filled with a cholesteric liquid crystal material 311, 312 and 313 respectively. The cholesteric materials of the three cells may each have a pitch length selected to reflect any color; preferably such reflective color of each cell is different than that of the others. Preferred such reflective colors for the triple stack are: blue for liquid crystal material 311; green for liquid crystal material 312 and red for liquid crystal material 313 as these primary colors when additively mixed enable the writing tablet to produce a broad range of color images particularly when shades of gray of each primary color can be invoked. In certain applications it may be desired that materials 311, 312 and 313 have a different handedness for the helical twist; for example, the top 301 and bottom 303 cells reflect light having right handed circular polarization whereas the middle cell 302 reflects light having left handed circular polarization. Such a configuration maximizes the reflective brightness of the writing tablet. Each of the cholesteric materials 311, 312, and 313 are in the form of a polymeric dispersion.

The triple cell writing tablet device can be made with either stacked separate cells or as a single unit sharing substrates. In FIG. 10, completed cells 301, 302 and 303 comprising different color electro-optic layers can be stacked as separate units and be joined with an index matching material 250 in between adjacent substrates. Likewise, the stacked structure can be made as a single unit that shares a common substrate between the electro-optic layers 311 and 312 or 312 and 313 as described above for the double stack display.

The triple stack includes Mode A in which a planar or focal conic line is written on a planar background and Mode B in which a planar line is written on a focal conic background. In the case of Mode A the droplets in a dispersion can be confined as separate droplets within the dispersion since flow of the liquid crystal is not required for this embodiment of the multiple color writing tablet. The dispersions may be of the type prepared by water borne emulsions or by polymerization induced phase separation as is known in the art. In Mode B the materials 311, 312 and 313 are droplet dispersions that allow localized flow sufficient to induce the planar texture. Droplets that are unconfined or are interconnecting allow flow to occur under the pressure of stylus 216 where the cell gap in the vicinity of the stylus 218 is reduced from its cell gap 217 elsewhere in the writing tablet.

i. Triple Cell Writing Tablet in Mode A:

The procedure of writing a multicolor image on the triple-stack writing tablet electronic skin in Mode A is to first erase all previous images by activating all write circuits 321, 322 and 323 to apply voltages of value Vp indicated by vertical line 35 of FIG. 11 to drive cells 301, 302 and 303 into the initial planar texture. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet to the reflective planar texture so that the background color of the writing tablet is a color additive mixture of the reflective colors of the cholesteric materials 311, 312 and 313 and any back color of the back display. Using the preferred reflective colors of blue, green and red for materials 311, 312 and 313, respectively and the black back color, the additive mixture will provide a white background.

In order to write an image on the top cell 301 using stylus 216, a voltage Vw must be applied by write circuit 322 and 323 to cells 302 and 303 during the writing process. The value of Vw is indicated by vertical line 236 of FIG. 8. For all embodiments of this disclosure it should be noted that the value of Vw depends on the color of the cholesteric liquid crystal for a given cell thickness. The threshold voltage is inversely proportional to the cholesteric pitch length, which is defined as the length it takes for a 360° rotation of the liquid crystal molecules. So, Vw for a blue cholesteric layer will be at a higher voltage than for a red cholesteric layer for the same cell gap. The voltage is applied for the duration of the stylus write; preferably a continuous AC voltage or a sequence of bipolar pulses. It is seen by curve 232 of FIG. 8 that a voltage Vw 236 will drive cells 302 and 303 to the focal conic texture in the vicinity of the stylus where pressure is applied and cell gap is reduced. In the remainder of the cells where the cell gap is not disturbed, the material will remain in the planar texture as indicated by the solid curve 231 leaving the original background color. This produces an image composed of the written portion at the reflected color of the top cell 302 only on a background that is an additive mixture of the colors reflected by the planar texture of all three cells (along with any back color).

In order to write an image on the middle cell 302 only using stylus 216, a voltage Vw must be applied by the write circuits 321 and 323 of top and bottom cells 301 and 303, respectively, during writing. The value of Vw is indicated by vertical line 236 of FIG. 8. The voltage is applied for the duration of the stylus write; preferably a continuous AC voltage or a sequence of bipolar pulses. It is seen by curve 232 of FIG. 8 that a voltage Vw 236 will drive the top 301 and bottom 303 cells to the focal conic texture in the vicinity of the stylus where pressure is applied and cell gap is reduced. In the remainder of the cells where the cell gap is not disturbed, the material will remain in the planar texture as indicated by the solid curve 231. This produces a written line having a color of the middle cell only (additive of any back color) on a background that is an additive mixture of the colors reflected by the planar texture of all three cells (along with any back color).

In order to write an image on the bottom cell 303 only using stylus 216, a voltage Vw must be applied by the write circuits 321 and 322 of the upper and middle cells 301 and 302, respectively. The value of Vw is indicated by vertical line 236 of FIG. 8. The voltage is applied for the duration of the stylus write; preferably a continuous AC voltage or a sequence of bipolar pulses. It is seen by curve 232 of FIG. 8 that a voltage Vw 236 will drive the top 301 and middle 302 cells to the focal conic texture in the vicinity of the stylus where pressure is applied and cell gap is reduced. In the remainder of the cells where the cell gap is not disturbed, the material will remain in the planar texture as indicated by the solid curve 231. This results in a written portion having a color of the bottom cell only (additive of any back color) on a background that is an additive mixture of the colors reflected by the planar texture of all three cells (along with any back color).

Operating in Mode A, write circuits 321, 322 and 323 can be used to erase the tablet (i.e., remove all color writing from the tablet) by providing a voltage Vp to each of cells 301, 302, and 303. It is seen by FIG. 8 that a voltage Vp 235 will drive all three cells entirely to the planar texture. The voltage may be an AC voltage pulse or a sequence of pulses, preferably bipolar pulses.

Written portions of grayscale color can be achieved in Mode A by applying either a reduced write voltage (V<Vw) or by reducing the force applied by the stylus to the display during the write. By reducing the write voltage to a value less than Vw during the write, one can see in FIG. 8 that the reflectance begins to increase, i.e., one is not inducing as many focal conic domains. If one applies a writing pressure that is between the pressures need to achieve the planar texture and the focal conic texture one can induce a grayscale planar texture. For the full color system, writing a grayscale color using the reduced voltage method is preferable as a reduced pressure would require Vf voltages applied to the other layers that will change with the cell gap, i.e., pressure applied by the stylus. Mixing of colors when the cells are at different gray levels can be used to provide a broad range of colors. A preferred triple stack writing tablet in Mode A reflects blue, green and red and has a black back display. This preferred writing tablet can produce a written portion of a select color of one or two of the layers on a white background. When the write voltage is applied to all of the cells of the preferred writing tablet, a black on white image can be obtained.

ii. Triple Cell Writing Tablet in Mode B

The procedure of writing a multicolor image on a triple-stack writing tablet electronic skin in Mode B is to first erase all previous images by activating write circuits 321, 322, and 323 to apply voltages of value Vf indicated by vertical line 237 of FIG. 8 to drive cells 301, 302 and 303 into the initial focal conic texture. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet electronic skin to the focal conic texture revealing the black or color of the back display.

To write an image on the top cell 301 only, using stylus 216 a voltage Vw is applied by the write circuits 322 and 323 to the electrodes of the middle and bottom cells 302 and 303, respectively, during the writing process. The value of Vw is indicated by vertical line 236 of FIG. 8. The voltage is applied for the duration of the stylus write; preferably a continuous AC voltage or a sequence of bipolar pulses. The purpose of the voltage is to maintain the focal conic texture of cells 302 and 303 in the written region where the cell gap is reduced by the action of the stylus. While this voltage is applied the pressure of the stylus does not induce a planar texture in the written portions of cells 302 and 303 but the focal conic texture of these cells is maintained during the writing process. The stylus 216 does, however, induce a planar texture in the reduced gap region of cell 301 in its vicinity that is believed to be due to lateral flow of the cholesteric liquid crystal resulting in the focal conic texture being transformed to the planar texture. This occurs even though no voltage is applied to the upper cell. The image will be a written portion composed of the color from the planar texture of the top cell 301 only (additive with any back color) on a background of the back display (black or a back color). Therefore, a planar image on a focal conic background on a stacked multicolor cell is possible by suitably applying a voltage to allow an image to be written on only on cell.

Similarly, in order to write an image on the middle cell 302 only, using stylus 216 a voltage Vw is applied by the write circuit 321 and 323 to the electrodes of the top and bottom cells 301 and 303 during the writing process. The value of Vw is indicated by vertical line 236 of FIG. 8. The voltage is applied for the duration of the stylus write; preferably a continuous AC voltage or a sequence of bipolar pulses. The purpose of the voltage is to maintain the focal conic texture in the written portions of cells 301 and 303. While this voltage is applied the pressure of the stylus does not induce a planar texture in cells 301 and 303 but the focal conic texture of these cells is maintained during the writing process. The stylus does, however, induce a planar texture to middle cell 302 due to induced lateral flow of the cholesteric liquid crystal resulting in the focal conic texture in the written portion or reduced cell gap region of the middle cell being transformed to the planar texture. This occurs even though no voltage is applied to the middle cell. The image will be a written portion composed of the color from the planar texture of the middle cell 302 only (additive with any back color) on a background of the back display (black or a back color).

Similarly, in order to write an image on the bottom cell 303 only using stylus 216 a voltage Vw is applied by the write circuit 321 and 322 to the electrodes of the top and middle cells 301 and 302 during the writing process. The value of Vw is indicated by vertical line 236 of FIG. 8. The voltage is applied for the duration of the stylus write; preferably a continuous AC voltage or a sequence of bipolar pulses. The purpose of the voltage is to maintain the focal conic texture of cells 301 and 302 under the action of the stylus. While this voltage is applied the pressure of the stylus does not induce a planar texture in the written portions of the upper and middle cells 301 and 302 but maintains their focal conic texture during the writing process. The stylus does, however, induce a planar texture to bottom cell 303 in the written portion thereof due to induced lateral flow of the cholesteric liquid crystal resulting in the focal conic texture being transformed to the planar texture. Therefore, a planar image on a focal conic background can be selectively written separately on each cell of the stack to produce a multiple color image. The image will be a written portion composed of the color from the planar texture of the bottom cell 303 only (additive with any back color) on a background of the back layer 219 (black or a back color).

A preferred three cell writing tablet in Mode B has respective reflective colors of the cholesteric liquid crystal layers 311, 312 and 313 that are blue, green and red as well as a back display that is black. The preferred triple stack writing tablet in Mode B can also produce a written portion of one or two select colors of one or two of the layers on the black background. These primary colors can be mixed to create intermediate colors. For example, the color of each layer can be placed at different levels of reflectivity or shades of gray, enabling images of multiple colors to be achieved by controlling the pressure of the stylus or by suitably controlled voltages less than voltage level Vw. In addition, when no write voltage is applied to all three cells of the preferred writing tablet, a written white on black background can be obtained when operating the preferred three cell writing tablet in Mode B.

Writing tablet electronic skins including additional stacked cells beyond the triple stack are possible with various combinations or reflective wavelengths including infrared and ultraviolet in addition to differing cholesteric materials such has different circular polarization handedness.

iii. Triple Cell Writing Tablet in Multimode:

The triple cell writing tablet electronic skin of FIG. 10 can operate in a multimode where the initial states are: two cells are focal conic and the third cell is planar; or where two cells are planar and the third cell is focal conic. This enables the following possibilities. Where the initial states are as follows: two cells are focal conic and the third is planar, 1) the writing tablet can produce a written portion that includes the selected color of one of the electro-optic layers on a background color that includes the color of one of the layers. This configuration also permits 2) forming a written portion that includes the additive mixing of the colors from two of the layers on a background color that includes the color of one of the layers. Where the initial states are as follows: two cells are planar and the third is focal conic, 3) a written portion can include the color of one selected layer on a background color that is an additive mixture of the colors of two of the layers. This also permits the possibility of 4) a written portion including a color that is the additive mixture of colors from two of the electro-optic layers on a background that includes the colors of two of the electro-optic layers.

Writing Tablet Example 1

A single layer flexible tablet that can operate in Mode B was constructed according to the following procedures described in U.S. patent applications Publication Nos. US 2009/0033811 and US 2009/0096942, which are incorporated herein by reference in their entireties, except without the light absorbing back layer (or background coating as it is sometimes called) to create a transparent writing tablet. The display was made using an anti-glare, hard coated 5 mil PET proximal substrate and a 7 mil PET distal substrate. Both substrates were cut to 12×18 cm in size and each coated on one side with conducting polymer, PEDOT, to serve as a transparent conducting electrode. The dispersion was created by non-encapsulating polymerization induced phase separation of a cholesteric liquid crystal using monomer chemistry following U.S. Pat. No. 7,351,506 B2. The electro-optic layer of the writing tablet was made from using a UV curable methacrylate-based monomer, acrylate-based cross-linker, diphenyl photoinitiator, and 4 micron spherical polyvinylidine spacers. The mixture consisted of: 75% (wt.) KLC19 (Kent Displays, Inc.) cholesteric liquid crystal premixed to selectively Bragg reflect green light at the desired peak reflective wavelength of 530 nm; 25% (wt.) photo-polymerizable monomer consisting of 81.6% (wt.) methyl methacrylate; 14.7% (wt.) trimethylolpropane triacrylate; 2.0% (wt.) Irgacure 651 (Ciba Specialty Chemicals); 1.7% (wt.) lauryl methacrylate.

The pre-polymerized PIPS solution was mixed with 4.0 µm spacers and laminated between the two substrates adjacent to the conducting polymer electrodes. The system was cured by exposure to UV light at 1.62 mW/cm$^2$ irradiance for 15 minutes. The displays were cut out of the panel according to the published U.S. patent application Pub. No. US 2007/0277659 along an outline of the shape of the display through the substrates, liquid crystal layers and electrodes. The display ledges exposing the transparent conductor on each substrate were coated with conductive carbon screen print material and cured to serve as an interconnect for applying voltage pulses. An AC pulse 18V 5 Hz was applied to the electrodes to switch the display to the focal conic texture. The waveform and magnitude of the voltage pulse to switch the display are well known in the art of a bistable cholesteric liquid crystal displays; e.g., U.S. Pat. Nos. 5,453,863 and 5,691,795. Selecting the various waveforms and magnitudes would be apparent to one of ordinary skill in the art in view of this disclosure.

Figure 11B:
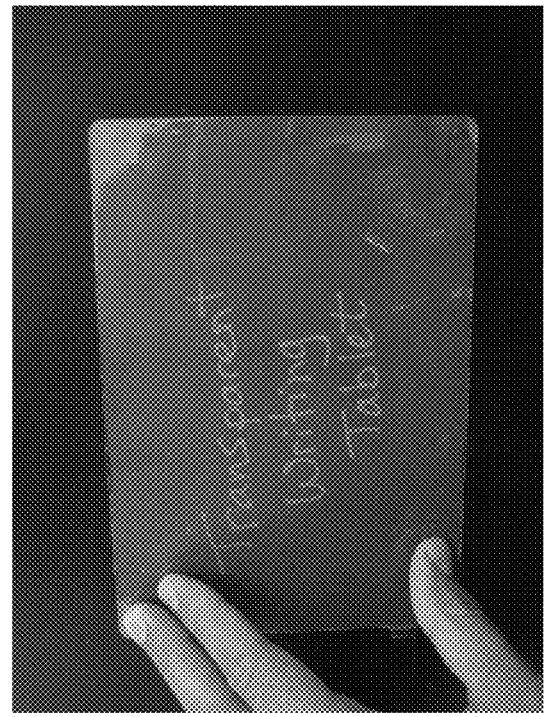
FIGS. 11a and 11b are photographs for the Writing Tablet Example 1 showing the writing tablet optically coupled to a backlit TFT LCD desktop monitor—with the monitor ON (FIG. 11a) and the monitor OFF (FIG. 11b). In the "monitor ON" case, the text on the monitor is clearly visible through the writing tablet electronic skin while the text on the writing tablet electronic skin is barely legible. In the "monitor OFF" case, the text on the writing tablet electronic skin is clearly visible.
Figure 11A:
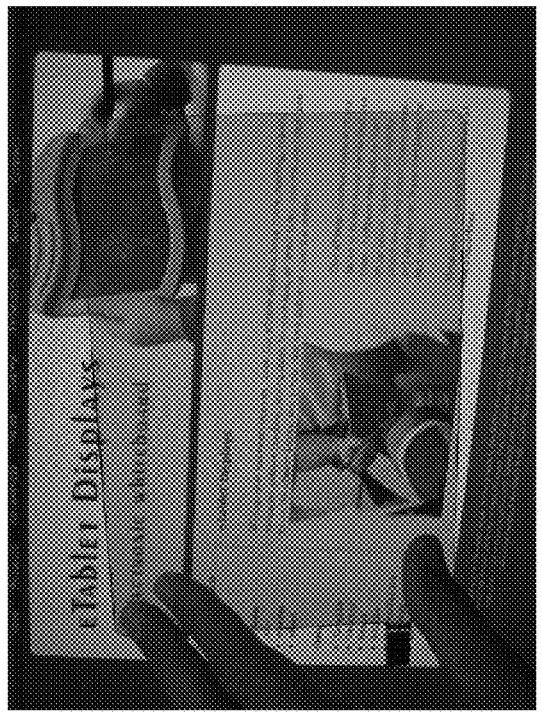

FIG. 11a shows the electronic skin writing tablet overlayed on an LCD with the LCD backlight ON. The electronic skin is transparent and can be seen through in this state. In FIG. 11b, once the LCD backlight is OFF one can write on the writing tablet with the pressure of a stylus. The contrast of the image written on the tablet is provided by the dark background of the LCD.

Writing Tablet Example 2

A double stack multiple color writing tablet overlaying an LCD display, as schematically illustrated in FIG. 9 was constructed enabling writing in colors blue, yellow or white on a black background with the pressure of an untethered stylus. A first or proximal cell 241 was constructed identical to the writing tablet cell of Writing Tablet Example 1 using 5 mil thick proximal PET substrate 211 with a 4 micron cell gap spacing except that the cholesteric liquid crystal was selected to be one that Bragg-reflects yellow light at a peak wavelength of approximately 580 nm. A second cell 242 was constructed using 2 mil bottom substrate 251 that was the commonly shared substrate for the second cell. The shared substrate 251 was coated on both sides with a conducting polymer PEDOT. Using the shared substrate as the proximal substrate and a 7 mil thick substrate as the distal substrate a second distal cell 242 was constructed identical to the writing tablet cell of Example 1 with a 4 micron cell gap spacing and with the cholesteric liquid crystal that reflects blue light at a peak wavelength of approximately 470 nm. Electrical connections to the displays were made with an electrically conductive woven silver tape (Adhesives research), attached to both the top and bottom ledges of both cells where the exposed conductive polymer was coated with SPI high purity silver paint. A function generator (Analogic Polynomial Waveform Synthesizer Model 2020) and amplifier (Kepco BOP500M) were connected to the silver tape electrodes of the cells using alligator clips.

Figure 12D:
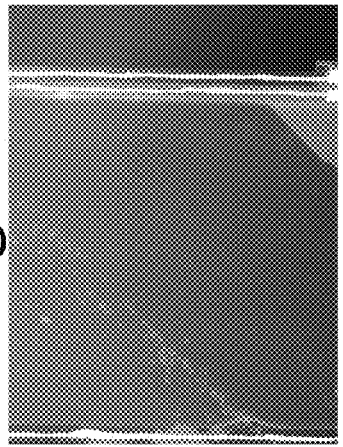
FIG. 12d: LCD turned off with writing tablet skin showing blue traces.

The double stack writing tablet was optically coupled to the LCD screen of a laptop for the display 203 using water as the index matching material 219 as illustrated in FIG. 9. With the LCD turned OFF to the dark state, the writing tablet was erased to the focal conic texture by applying an 18V, 200 ms pulse with a 100 ms period bipolar square wave to the electrodes of the top cell and of the bottom cell. With these pulses both cells were switched to the focal conic texture and the writing tablet exhibited a black color since the focal conic texture is transparent revealing the black color of the LCD with the back light off. A white image was then written on the stacked multicolor tablet by the pressure of a pointed stylus. FIG. 12a shows a photograph of such an image in which the stylus was used to write the word "WHITE". Note that no voltage was applied to the cells during the writing process. The pressure of the stylus induced flow in the liquid crystal which further induced the planar texture. Liquid crystal flow under the stylus tip induced the yellow planar texture in the upper cell as well as the blue planar texture in the lower cell. Both of these colors additively mixed to yield the white reflective color on the black background of the LCD in the OFF state.

Figure 12C:
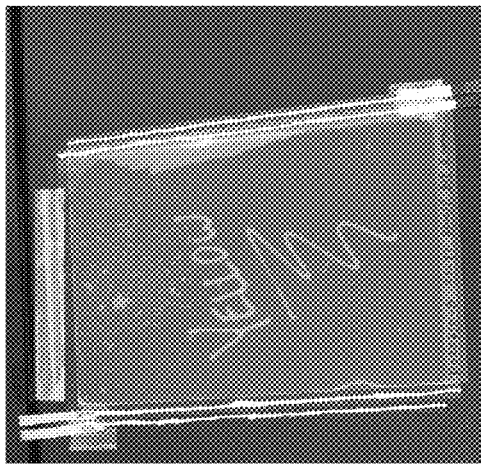
FIG. 12c: LCD turned off with writing tablet skin showing yellow traces.
Figure 12A:
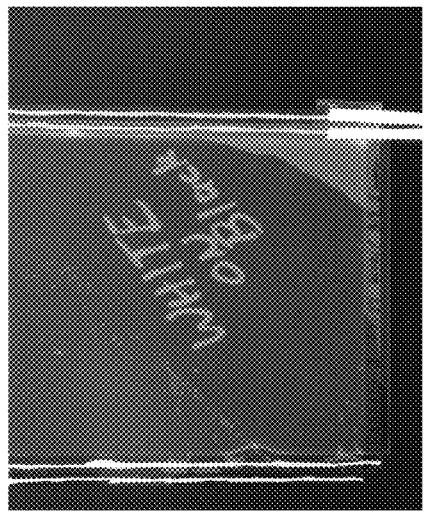
FIG. 12a: LCD turned off with writing tablet skin showing white traces.
Figure 12E:
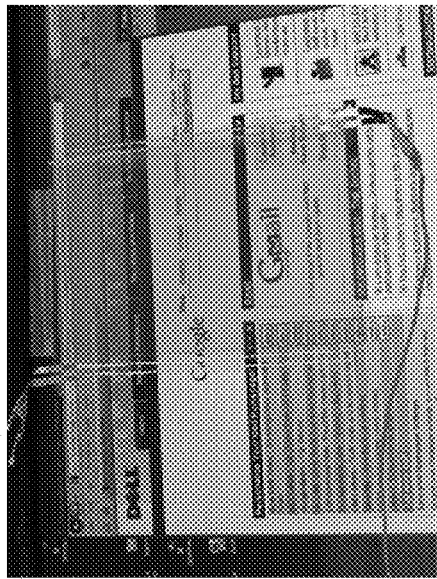
FIG. 12e: LCD turned on with writing tablet skin switched to the homeotropic state.
Figure 12B:
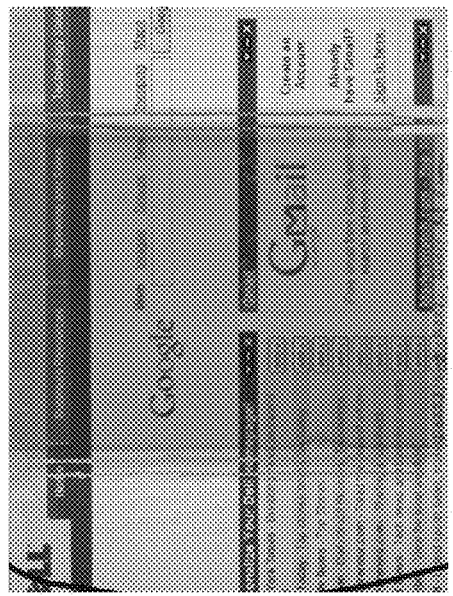
FIG. 12b: LCD turned on with writing tablet skin showing white traces.

With the white image traced on the writing tablet, the LCD backlight was next turned ON to display an image on the LCD screen as photographed in FIG. 12b. It is seen in the photograph that the image on the LCD screen is clearly visible whereas the white image traced on the writing tablet is barely visible. The white image on the writing tablet could be erased by applying an 18V, 200 ms pulse with a 100 ms period bipolar square wave to the electrodes of the top cell and of the bottom cell.

With the LCD backlight now turned OFF, a yellow image was then written on the multicolor tablet by applying a continuous 6V square wave voltage (voltage Vw of FIG. 9) with a 10 ms periodicity to the electrodes of the distal (blue) cell 242 only and the pressure of a pointed stylus then used to write the word "YELLOW" as shown in the photograph of FIG. 12c. Note that in this case, voltage applied to the electrodes of the distal (blue) cell 242 maintains the focal conic texture of the lower cell so that no planar image is written on that cell. However, a yellow image is written on the proximal cell 241 without applying any voltage to the electrodes of that cell, where flow drives the focal conic texture to the planar texture in the vicinity of the stylus. The yellow image on the writing tablet could be erased by applying an 18V, 200 ms pulse with a 100 ms period bipolar square to the electrodes of the proximal cell 241.

With the LCD backlight turned OFF, a blue image was then written on the multicolor tablet by applying a continuous 6V square wave voltage Vw with a 10 ms periodicity to the electrodes of the proximal cell 241 only and the pressure of a pointed stylus then used to write the word "BLUE" as shown in the photograph of FIG. 12d. Note that in this case, voltage applied to the electrodes of the proximal (yellow) cell 241 maintains the focal conic texture of the upper cell so that no planar image is written on that cell. However, a blue image is written on the distal cell 242 without applying any voltage to the electrodes of that cell, where flow drives the texture to the planar texture in the vicinity of the stylus. The blue image on the writing tablet could be erased by applying an 18V, 200 ms pulse with a 100 ms period bipolar square to the electrodes of the bottom cell.

With the LCD turn ON, the double stack writing overlay was now driven to the homeotropic state by applying a continuous 40V bipolar square wave with a 10 ms period to each or the cells in the double stack and photographed, shown in FIG. 12e. The LCD image was observed to be clearer than when both cells were driven to the focal conic state as, for example, in FIG. 12b.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. An electronic device with overlayed electronic skin comprising:
    an electronic device including a display having an outer transparent display screen, wherein said display is placed in a dark state or in a bright state and is not a cholesteric liquid crystal display;
    electronic skin that overlays said outer display screen, said electronic skin being in a form of a writing tablet, said electronic skin comprising:
    a) an electro-optic layer comprising electro-optic material;
    b) transparent, unpatterned electrically conductive layers on each side of said electro-optic layer;
    c) a transparent substrate or polymer layer that forms a writing surface on a side of said electro-optic layer that is more proximal to a viewer, wherein said substrate or polymer layer is flexible so as to reduce a gap between said electrically conductive layers when writing pressure is applied to said writing surface, wherein said writing pressure applied to said writing surface forms an image by changing said liquid crystal material to a reflective state or a substantially transparent state where said writing pressure is applied; and
    d) electronic circuitry for applying voltages to said electrically conductive layers, wherein said voltages enable said electro-optic material to be placed into various states of reflectance including a substantially transparent state and a reflective state;
    wherein said image is displayed on said electronic skin while light passing through said electronic skin is absorbed by said display in said dark state, and
    wherein when said display is in said bright state, said display is seen through said electronic skin.

2. The electronic device with overlayed electronic skin of claim 1 wherein said electrically conductive layers include a distal said electrically conductive layer that is more distal from a viewer than the other said electrically conductive layer, comprising a distal substrate located more distal from a viewer than said distal electrically conductive layer.

3. The electronic device with overlayed electronic skin of claim 2 comprising an optical coupling layer located between said distal substrate and said display screen that matches indicies of refraction of said distal substrate and said display screen.

4. The electronic device with overlayed electronic skin of claim 1 wherein said electro-optic layer of said electronic skin includes stacked liquid crystal layers, electrically conductive layers being disposed on both sides of each of the stacked liquid crystal layers.

5. The electronic device with overlayed electronic skin of claim 1 wherein said electro-optic material includes a bistable cholesteric liquid crystal material.

6. The electronic device with overlayed electronic skin of claim 4 wherein said liquid crystal layers comprise bistable cholesteric liquid crystal material, said bistable cholesteric liquid crystal material in each said liquid crystal layer having a pitch length effective to reflect light of a different color than in the other said liquid crystal layers.

7. The electronic device with overlayed electronic skin of claim 6 wherein said electronic skin includes three stacked said liquid crystal layers that reflect one of red, blue and green light as said colors.

8. The electronic device with overlayed electronic skin of claim 1 wherein said writing pressure applied to said writing surface changes the state of said liquid crystal material from said substantially transparent state to a reflective planar texture having said reflective state where said writing pressure is applied.

9. The electronic device with overlayed electronic skin of claim 1 wherein said circuitry enables application of said voltages to said electrically conductive layers while applying said writing pressure to said writing surface to change the state of said liquid crystal material from said reflective state to a focal conic texture having said substantially transparent state where said writing pressure is applied.

10. The electronic device with overlayed electronic skin of claim 6 wherein said electronic skin includes at least two stacked said liquid crystal layers each having a pitch length effective to reflect a different color, comprising selecting with said circuitry a reflected color of one of said liquid crystal layers where said writing pressure is applied by applying voltage that places another of said liquid crystal layers in a focal conic texture having said substantially transparent state where said writing pressure is applied.

11. The electronic device with overlayed electronic skin of claim 5 wherein said electronic skin includes a non-transparent portion having a light absorbing layer disposed behind said electro-optic layer and another portion without a light absorbing layer behind said electro-optic layer in which said display is seen through said electronic skin, comprising a housing for said display, wherein said nontransparent portion covers a portion of said display, said display housing or both a portion of said display and said display housing.

12. The electronic device with overlayed electronic skin of claim 5 wherein when said display is in said bright state said circuitry applies voltages to said conductive layers that make said electronic skin more see-through by placing said liquid crystal material of said electronic skin in a homeotropic texture.

13. The electronic device with overlayed electronic skin of claim 5 wherein when said display is in said bright state said circuitry applies voltages to said conductive layers that make said electronic skin more see-through by placing said liquid crystal material of said electronic skin in a focal conic texture.

14. The electronic device with overlayed electronic skin of claim 1 wherein said electronic device is selected from the group consisting of a cell phone, an MP3 player, a pda, a laptop computer, a notebook computer, a netbook computer, a camera, a desktop monitor, a slate computer, an electronic tablet device, a handheld electronic device, and a portable electronic device.

15. The electronic device with overlayed electronic skin of claim 1 wherein said electro-optic material is dispersed in a polymeric matrix.

16. The electronic device with overlayed electronic skin of claim 5 wherein said liquid crystal material is dispersed in a polymeric matrix.

17. The electronic device with overlayed electronic skin of claim 1 wherein there is no light absorbing layer behind at least a portion of said electro-optic layer that overlays said display screen.

18. The electronic device with overlayed electronic skin of claim 1 wherein said electronic skin completely covers said display screen.

19. The electronic device with overlayed electronic skin of claim 1 wherein said electronic device includes a housing inside of which said display is located.

20. The electronic device with overlayed electronic skin of claim 1 wherein there is no black or colored light absorbing layer between at least a portion of a rearmost said liquid crystal layer of said electronic skin and said display screen.

21. The electronic device with overlayed electronic skin of claim 1 wherein when said display is in said bright state, images or colors are displayed on said display that are seen through said electronic skin.

22. An electronic device with overlayed electronic skin comprising:
an electronic device including a primary display having an outer transparent display screen, wherein said primary display is placed in a dark state or in a bright state;
electronic skin that overlays said outer display screen, wherein said electronic skin is a writing tablet, said electronic skin comprising:
a) an electro-optic layer comprising a polymeric dispersion including bistable cholesteric liquid crystal material that allows localized flow of said liquid crystal caused by writing pressure from a stylus on said electronic skin that forms an image by changing said liquid crystal material to a reflective state or a substantially transparent state where said writing pressure is applied in a vicinity of a tip of said stylus;
b) transparent electrically conductive layers on each side of said electro-optic layer; and
c) electronic circuitry for applying voltages to said electrically conductive layers, wherein said voltages enable said electro-optic material to be placed into one of said substantially transparent state or said reflective state so as to erase said image;
wherein said image is displayed on said electronic skin while light passing through said electronic skin is absorbed by said primary display in said dark state, and wherein when said primary display is in said bright state said primary display is seen through said electronic skin.

23. The electronic device with overlayed electronic skin of claim 22 wherein said outer display screen is completely covered by said writing tablet.

24. The electronic device with overlayed electronic skin of claim 22 wherein said electronic device is selected from the group consisting of a cell phone, an MP3 player, a pda, a laptop computer, a notebook computer, a netbook computer, a camera, a desktop monitor, a slate computer, an electronic tablet device, a handheld electronic device, and a portable electronic device.

25. The electronic device with overlayed electronic skin of claim 22 wherein when said primary display is in said bright state, images or colors are displayed on said primary display that are seen through said electronic skin.

* * * * *

UNITED STATES PATENT AND TRADEMARK OFFICE
CERTIFICATE OF CORRECTION

PATENT NO. : 8,760,415 B2
APPLICATION NO. : 12/729678
DATED : June 24, 2014
INVENTOR(S) : Asad Khan Page 1 of 1

It is certified that error appears in the above-identified patent and that said Letters Patent is hereby corrected as shown below:

In the Specification

Column 9, line 23: please delete the word "as"

Signed and Sealed this
Ninth Day of September, 2014

Michelle K. Lee
*Deputy Director of the United States Patent and Trademark Office*